(12) United States Patent
Badal-Badalian et al.

(10) Patent No.: US 12,499,440 B2
(45) Date of Patent: *Dec. 16, 2025

(54) SYSTEM AND METHOD FOR SECURE WEB SERVICE ACCESS CONTROL

(71) Applicant: ROYAL BANK OF CANADA, Toronto (CA)

(72) Inventors: Arnold Badal-Badalian, Toronto (CA); Seung Bong Baek, Toronto (CA); Ravi Khandavilli, Orlando, FL (US)

(73) Assignee: ROYAL BANK OF CANADA, Toronto (CA)

( * ) Notice: Subject to any disclaimer, the term of this patent is extended or adjusted under 35 U.S.C. 154(b) by 188 days.

This patent is subject to a terminal disclaimer.

(21) Appl. No.: 18/133,896

(22) Filed: Apr. 12, 2023

(65) Prior Publication Data
US 2023/0252463 A1 Aug. 10, 2023

Related U.S. Application Data

(63) Continuation-in-part of application No. 17/585,154, filed on Jan. 26, 2022.

(60) Provisional application No. 63/330,181, filed on Apr. 12, 2022, provisional application No. 63/141,726, filed on Jan. 26, 2021.

(51) Int. Cl.
G06Q 20/38 (2012.01)
(52) U.S. Cl.
CPC ................. *G06Q 20/3829* (2013.01)
(58) Field of Classification Search
CPC .................................... G06Q 20/389

USPC ........................................... 705/71
See application file for complete search history.

(56) References Cited

U.S. PATENT DOCUMENTS

| | | |
|---|---|---|
| 2016/0307194 A1 | 10/2016 | Bhatnagar et al. |
| 2016/0351080 A1 | 12/2016 | Bhatnagar et al. |
| 2017/0070484 A1* | 3/2017 | Kruse ............. H04L 9/14 |
| 2017/0132594 A1 | 5/2017 | Morgan et al. |
| 2018/0130051 A1 | 5/2018 | Matthews et al. |
| 2020/0005106 A1* | 1/2020 | Singh ............. G06Q 20/3827 |
| 2021/0035086 A1 | 2/2021 | Khan et al. |
| 2022/0108344 A1* | 4/2022 | Glynn-Udrow .... G06Q 30/0222 |

OTHER PUBLICATIONS

United States Patent & Trademark Office (USPTO), Non Final Rejection issued to U.S. Appl. No. 17/585,154, Sep. 25, 2023.

* cited by examiner

*Primary Examiner* — Courtney P Jones
(74) *Attorney, Agent, or Firm* — Norton Rose Fulbright Canada LLP

(57) ABSTRACT

A computer system and method for populating electronic payment credentials is provided. The system comprises at least one processor and a memory storing instructions which when executed by the processor configure the processor to perform the method. The method comprises receiving a browser extension activation input, sending a payment details request message to a financial institution system, receiving payment details from the financial institution system following authentication at a mobile device, and populating a payment form on the browser using the payment details. Dynamic credentials are provided by the financial institution system and combined with pre-populated tokenized credentials during automatic entry into the payment form.

20 Claims, 14 Drawing Sheets

SYSTEM AND METHOD FOR SECURE WEB SERVICE ACCESS CONTROL

CROSS-REFERENCE

This application claims all the benefit, including priority to, U.S. Application No. 63/330,181, filed 12 Apr. 2022, entitled "SYSTEM AND METHOD FOR SECURE WEB SERVICE ACCESS CONTROL", incorporated herein by reference in its entirety.

This application is a continuation-in-part of U.S. application Ser. No. 17/585,154, entitled System and Method for Secure Web Service Access Control, filed 26 Jan. 2022, which also claims priority to U.S. Application No. 63/141,726, also entitled System and Method for Secure Web Service Access Control, filed 26 Jan. 2021.

FIELD

The present disclosure relates to computer graphic user interface control for hybrid overlays, and in particular to a system and method for secure web service access control while utilizing the hybrid overlay by incorporating secure dynamic communications.

INTRODUCTION

Graphical user interfaces are utilized to handle sequential process flows which may require the provisioning (e.g., input) and processing of sensitive information. Whenever a sensitive sequence is triggered in the graphical user interface, it can be cumbersome to insert or otherwise interject with secure processing screens and renderings that are required to input certain higher security values or information elements.

Accordingly, increasing security due to increased prevalence of theft and malicious actions/actors has led to graphical user interface flows requiring a large number of additional steps using specialized interface screens that often do not match the existing flow utilized for a merchant website.

A challenge with existing graphical user interfaces (GUIs) for merchants is that they are designed to interoperate with individuals using static information printed on physical plastic cards, which lead to significant transactional and cybersecurity risk. For example, the static information, such as credit card numbers, CVV numbers, can be captured by malicious actors using photography, or through computer-based message interception or key-logging software/hardware. Accordingly, while convenient for the user, using static information is disadvantageous from a cybersecurity perspective, leading to potentially significant transactional security vulnerabilities.

Physical plastic cards having static information printed thereon are increasingly vulnerable to photographic based approaches to theft, where the user's card is surreptitiously scanned, imaged, etc., such that the information printed thereon can be extracted. This can happen, for example, when the user hands the card at a restaurant or a taxi to be charged, etc.

SUMMARY

An improved computational approach is proposed that utilizes a hybrid graphical user interface overlay operating in concert with an underlying website and one or more backend computing devices for transaction processing and/or security validation. In particular, the hybrid graphical user interface overlay can be provided in the form of a browser extension or browser embedded code that is triggered by one or more conditional hooks, modifying the operation of the underlying website through coordinated data messaging with a backend server.

This approach is more computationally expensive and complex than using static information printed on the card, but it takes advantage of additional processing capabilities that can be configured into the browser extension for use with existing websites to add increased security capabilities without requiring extensive modification of the existing websites.

When triggered, the hybrid graphical user interface overlay (the extension) operates by implementing additional data messaging steps that transform a previously static field, such as a card verification value (CVV) into a dynamic field the use of additional steps using encryption keys.

During a pre-registration process, a user's device having a secure key storage memory region is provisioned with a keypair, such that the user's device maintains a private key in the secure key storage memory region, and a backend processing server stores the corresponding public key. The public key can be used to exchange secret (e.g., AES) keys and those are used to encrypt and decrypt messages. Even these AES keys, for example, can be stored in the secure hardware. The enclave can be configured such that the private keys can only be used for signing and decrypting. The public key (e.g., stored on the secure enclave and/or at the issuer as part of the pre-registration/binding process) can be used for encrypting, or in some cases, validating signatures.

During a check-out process (e.g., upon being triggered), the hybrid graphical user interface overlay code triggers the user's device to conduct an additional verification process step (e.g., a biometric check) to unlock access to the secure key storage memory by the data process, and thus providing access to utilize the stored private key. The stored private key is utilized to sign or otherwise encrypt messages originating from the user's device to the backend server.

During the checkout process, instead of, or in addition to, entering the previously static field, the dynamic field is instead obtained through a backend data message process that in real-time or near-real time in response to the backend data message process being initiated. The approach can be used to retrofit websites that are adapted to still use static security fields by using the browser extension to request a dynamic field instead and enter that into the input field on the website that would otherwise take the static security field. Accordingly, the issuer or backend transaction servers can provide computational messaging mechanisms in accordance with the proposed approaches to increase security without burdening merchants or website owners to make substantial changes to add this functionality. As noted, in some embodiments, the merchant websites can also make minor amendments to their webpage code to add additional "hooks" that, when parsed by the browser extension, can indicate that the merchant is (1) participating in the optional additional security approach, and (2) when certain webpages relating to shopping carts or checkouts are rendered so that the DTVV generation process can start earlier to reduce the effect of processing lag during the coming checkout steps.

In particular, a variant embodiment functions through requiring an additional biometric validation process to obtain access to the secure key storage memory region or otherwise authorize the user's device to sign or encrypt the messages originating from the user's device to the backend server. A graphical user interface overlay mechanism is described in some embodiments where a graphical user interface overlay is rendered as part of a webpage or web application rendering, or rendered over top of webpage or web application rendering to provide a hybrid overlay of original webpage/web application rendering and additional interjected elements overlaid over, in line with, or replacing elements of the original webpage/web application rendering.

The overlay is provided by application code provided as a configurable GUI extension software module/plug-in operating in concert with a graphical user interface engine (e.g., a browser). The configurable software module interoperates with the graphical user interface engine and executes code to generate additional renderings or to modify how the renderings are generated by the graphical user interface engine. The configurable GUI extension software module can interoperate with a corresponding mobile application (e.g., on a mobile phone), in some embodiments, but in other embodiments, may be a standalone GUI extension software module that operates alongside a browser (e.g., on a desktop).

The GUI extension software module is configured to be initialized during a registration process and populated with secure data sets that are obtained from a backend server. The data sets can include, for example, API secrets, keypairs (symmetrical or asymmetric), keys, certificates, among others. In a further embodiment, during the registration process, the secure data sets include a handshaking procedure whereby a unique identifier of the GUI extension software module (e.g., an installation code or a hash generated during initialization) is exchanged with the backend server that can be used for future authentications of the GUI extension software module. The data sets can further include tokenization information of a particular secure credential associated with the user, such as a tokenized variant of the user's payment credentials. In a further embodiment, the tokenized variant of the user's payment credentials is generated specifically for the GUI extension software module such that it is bound to a particular instance of GUI extension software module.

The GUI extension software module operates alongside a browser or a rendering engine of a mobile application, for example, executable as a browser extension that is loaded during operation of the browser or rendering engine. The GUI extension software module is configured to process or intercept incoming and out-going rendering code and input commands, and can interject or inject code or entries into incoming or out-going rendering code and commands. For example, the GUI extension software module can automatically fill and/or populate electronic payment credentials.

The GUI extension software module can be utilized for detection of a state of a purchase, and can be configured for being triggered upon detection of a particular state. For example, the GUI extension software module detects that the user is at a merchant checkout rendering flow or screen, and the overlay mechanism can be triggered at this point. The overlay mechanism can be utilized to render additional visual interactive controls, such as buttons, input screens, trigger biometric inputs, among others, which can be utilized, for example, to log into additional accounts, provide additional layers of security and authentication, among others.

The GUI extension software module, during this process, utilizes the stored data sets and interjects into the checkout process by entering the user's checkout credentials as required for the merchant checkout flow or screen, such as inputting in information such as credit card number, expiry dates, addresses, names, among others. In some embodiments, the GUI extension software module is also configured to establish a secure channel with the backend server during this process to obtain dynamic information about the token, which can include dynamic time-varying or instance-varying fields that are used to autofill the payment credentials. In some embodiments, the dynamically obtained information that is obtained in real-time or near-real time is programmatically generated for the specific transaction or available only for a particular time period such that security can be enhanced for the transaction without requiring a modification of the merchant payment flow.

In some embodiments, the process to obtain the dynamically obtained information may require an additional security handshake message flow where the URL of the merchant flow is also incorporated into the security handshake to increase security of the process.

The GUI extension software module is provided by a computer system that comprises at least one processor and a memory storing instructions which, when executed by the processor, configure the processor to receive a browser extension activation input, send payment details request message(s) to a financial institution system (e.g., the backend server), receive payment details from the financial institution system following authentication at a mobile device, and populate a payment form on the browser using the payment details.

The GUI extension software module is configured for improved authentication steps as described above in various embodiments, such as enhanced handshaking using identifiers of the device, the application/GUI extension software module instance, and/or the URL, or a combination of some or all of these to provide enhanced authentication without modifying the underlying merchant flow.

The GUI extension software module can be implemented as a computational process or method provided through executable code residing on or accessible to a computing device. In some embodiments, the computing device is a mobile device or a personal computer. Corresponding systems and devices, and logic structures such as machine-executable coded instruction sets for implementing such systems, devices, and methods are contemplated.

Accordingly, the approach proposed herein provides an additional security back channel that is not visible to the user's interactions with the website, but rather is established through a combination of the user's mobile device's secure enclave and the backend payment processor server. A practical, computational approach for enhancing security is thus provided to merchants and payment processor entities that can be optionally implemented without expensive modifications to existing merchant webpages. For example, the merchant website can thus be configured to both handle regular payment flows, or enhanced payment flows using the additional security back channel that is established through the requesting, generation of, and eventual input field entry using a dynamically generated verification value. In some embodiments, the dynamically generated verification value is provided in the same form as a static verification value. In another embodiment, instead of having the same format, a pure cryptogram is generated that is input using a field that is not made visible to the user.

In terms of a practical example, a user first pre-registers and binds the user's device to the payment processor, such that the key sharing process is initiated such that the user's device's secure enclave now is primed with a private key that is not made available or accessible in a raw format, rather it can only be interacted with through high security, functionally limited protocols. This binding can be done as part of a pre-registration process.

The user can either use a browser that has specific additional code incorporated in, such as a browser that has extension code, or, in some embodiments, the user's device automatically imparts extension code as part of the browser execution, for example, through integration into the operating system directly.

The user uses the browser to navigate to the merchant website, and begins a shopping journey by controlling the interface to place items into a shopping cart, etc. The merchant website optionally can include "hooks" that indicate that the merchant's website is compatible for enhanced security, and these hooks, for example, can indicate different types of webpages that represent different payment states.

When the user is checking out, there may be a set of form input fields in the interface that request information, such as credit card information, and a verification value. These fields could be the same as if the user was reading information off of the user's physical card. However, in this variation, the browser extension code specially configures the browser to conduct an improved DTVV request protocol, where instead of using the static information from the user's physical card, or in combination thereof, the DTVV is requested in real-time or near-real time from a financial institution backend. As part of the request protocol, in some embodiments, the user's device provides access to the secure enclave through an additional verification check, and the secure enclave and keys stored thereon can be used to sign or otherwise encrypt the DTVV request message.

As described herein, a number of variations are also proposed to modify the process to render some steps asynchronous relative to the actual provisioning of the DTVV value from the backend to reduce the lag impact that may result due to the complexity of secure generation processes used by the backend to generate the DTVV. In a further variation, the DTVV is available for use for a time-limited period of time to reduce the computational overhead with DTVV generation, or in other embodiments, the DTVV is burned after use or burned after the time-limited period of time to prevent or limit the potential for replay attacks.

In another variation, the DTVV request message includes additional fields, such as the amount of time, and/or a transaction amount (e.g., an increased transaction amount relative to insecure approaches) that can be coupled with that DTVV. When the DTVV is generated by the issuer/transaction backend server, during the verification steps, the issuer/transaction backend server can check how much time is left on the DTVV validity or how much funds are left on the DTVV validity. This can be useful in certain situations, such as where there are going to be repeat transactions for a merchant or repeat transactions for a user to avoid the computational costs of generating a DTVV for each transaction, establishing a separate secure channel, etc.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
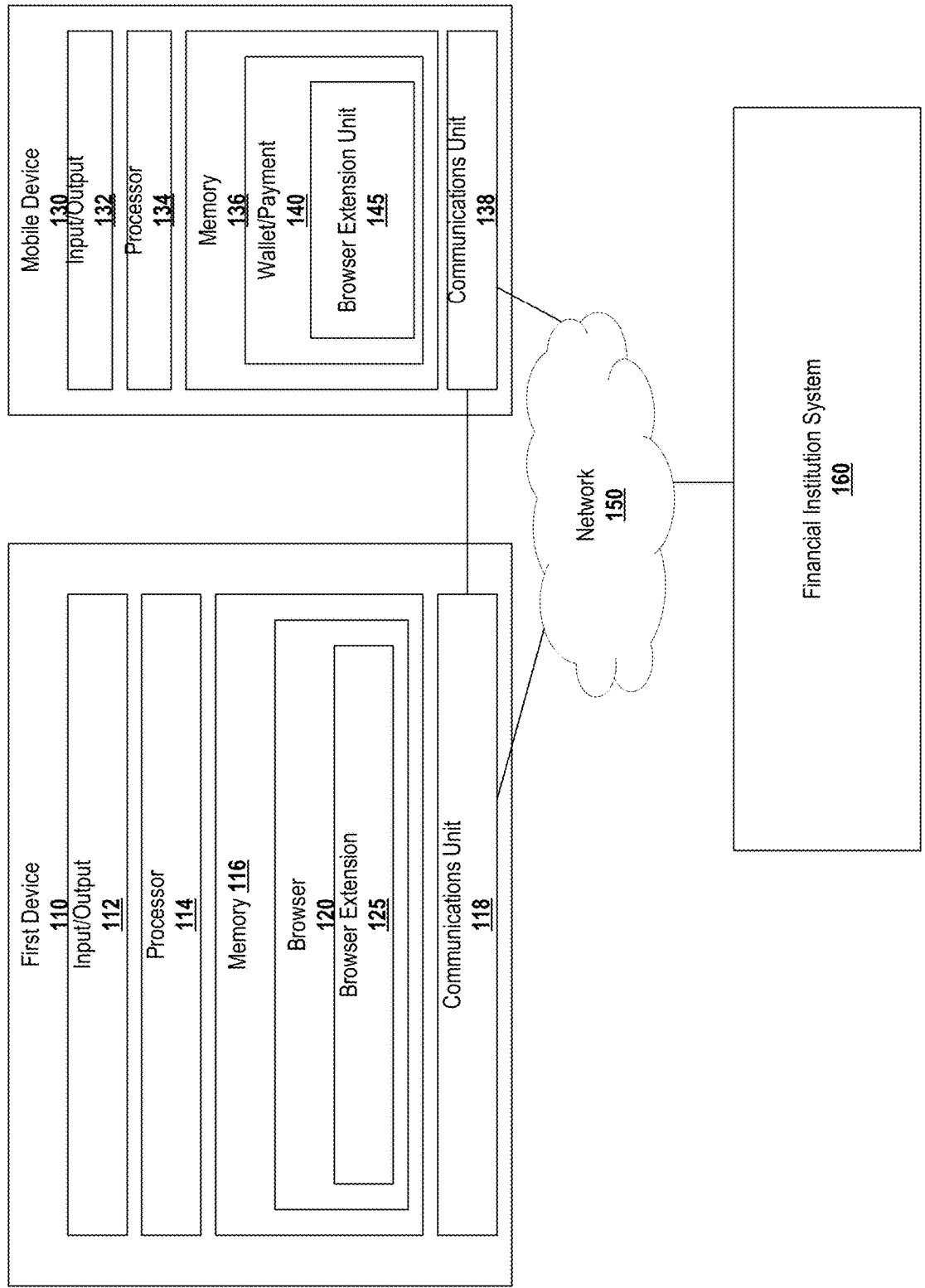
FIG. 1 illustrates an example of an electronic payment system, in accordance with some embodiments.

A graphical user interface overlay mechanism is described in some embodiments where a graphical user interface overlay is rendered as part of a webpage or web application rendering, or rendered over top of webpage or web application rendering to provide a hybrid overlay of original webpage/web application rendering and additional interjected elements overlaid over, in line with, or replacing elements of the original webpage/web application rendering.

The hybrid overlay can be utilized as an improved webpage/web application autofill mechanism that is configured as an automated field auto-fill tool that can operate in an extension of a browser. A benefit of providing a hybrid overlay is that it can be utilized in-path of a payment experience on various merchant sites, and can provide functionality for seamless payouts at checkout while still maintaining improved device binding/authentication and dynamic verification as part of the computerized checkout process, as described in various alternative embodiments herein.

In some embodiments, a browser extension system for facilitating electronic payments between a browser on a first device and a wallet on a mobile device is provided. The browser extension system allows for an automatic populating of payment credential details in an online payment form. Any authentication on the mobile device would indirectly provide a two factor authentication for the electronic purchase.

In the proposed approach, a dynamic request for a dynamic time verification value (DTVV) is generated from a mobile device using a function that can, for example, include using a biometric input and an identifier. The DTVV request can, for example, be signed or otherwise encrypted by through using a private key that is stored on secure key storage on the mobile device.

The biometric input can be requested, for example, by a browser extension or other overlay code that operates on top of or in conjunction with a browser or other mobile application on the user's mobile device.

Responsive to a confirmation that the DTVV request is correctly formed and/or authorized (e.g., through validation against a corresponding public key that relates to the private key), the DTVV is generated at the FI processor/TSP backend.

In some embodiments, at the time of entering a checkout section of a webpage, the browser extension identifies that a secure checkout is occurring, and a challenge message can be generated on the backend that is that is sent to the client device.

The client device asks for the biometric verification to access or otherwise use the private key from the secure enclave, which begins the request DTVV process. In some embodiments, a corresponding message or identifier is used to establish a secure channel to provide a communication mechanism for the backend to send the DTVV and/or for the mobile device or browser extension to input the DTVV into the corresponding web page input field.

A pre-registration step may be required to provide the initial key exchange, binding the specific mobile device and/or secure enclave to the backend processor. If the mobile device is thus bound, in some embodiments, the binding can further include the transfer of nonces or other information for the set up of secure communication channels as between the specific mobile device and the backend processor.

FIG. 1 illustrates an example of an electronic payment system 100, in accordance with some embodiments. The electronic payment system 100 comprises a first device 110, a mobile device 130, a network 150 and a financial institution system 160. The first device 110 may communication with the mobile device directly or via network 150. The financial institution system 160 may communication with either the first device 110 or mobile device 130 via the network 160. Other components may be added to the electronic payment system 100, including a merchant e-commerce system and a payment network.

The first device 110 may be a desktop, laptop, tablet, mobile phone or any other computing device capable of hosting a web browser. The first device 110 may comprise an input/output 112, at least one processor 114, a memory 116 and a communications unit 118. The memory 116 comprises a browser 120 having a browser extension 125. Other components may be added to the first device.

The mobile device 130 may be a smart phone, tablet or any mobile device capable of storing a payment wallet application. The mobile device 110 may comprise an input/output 132, at least one processor 134, a memory 136 and a communications unit 138. The memory 136 comprises a wallet/payment application 140 having a browser extension unit 145. The mobile device 130 a payment wallet application 140 on a mobile device 130, and a browser extension unit 135 on the mobile device. Other components may be added to the mobile device.

In FIG. 1, the hybrid overlay is provided through a combination of browser 120 operating in concert with browser extension 125. The browser extension 125 may be configured for monitoring or otherwise intercepting rendering code and fields being provided (e.g., HTML GET/POST, HTML, Javascript), and modify what is ultimately rendered to the user on the mobile device 130 or the first device 110. In some embodiments, the hybrid overlay is placed over top of the original browser 120 visual components, while in other embodiments, the hybrid overlay is injected into the code and code hierarchy of the rendering code such that it appears in line with existing objects. In some combinations, both approaches are utilized.

The overlay is provided by application code provided as a configurable GUI extension software module/plug-in operating in concert with a graphical user interface engine (e.g., a browser). The configurable software module interoperates with the graphical user interface engine and executes code to generate additional renderings or to modify how the renderings are generated by the graphical user interface engine. The configurable GUI extension software module can interoperate with a corresponding mobile application (e.g., on a mobile phone), in some embodiments, but in other embodiments, may be a standalone GUI extension software module that operates alongside a browser (e.g., on a desktop).

The GUI extension software module is configured to be initialized during a registration process and populated with secure data sets that are obtained from a backend server. The browser extension 125 may be bound with the user's mobile device and/or with a secure transaction backend through the usage of nonces or other shared secrets to increase a level of security.

In some embodiments, the browser extension 125 parses incoming code to identify configuration aspects of the webpage that can indicate a voluntary participation in an enhanced security program where additional security features can be made possible through the use of the browser extension 125 and the secure enclave of the user's mobile device 130. For example, the website may have various types of web site elements, such as HTML tags, or other indicia (e.g., <head> <participateExtensionDTVV=TRUE>. Where the website is participating, and identifies enhanced security capabilities, for example, it may modify its backend rules processing to allow for enhanced risk due to the increased level of security provided through the browser extension 125. For example, instead of requiring additional authorization if the transaction value is $250, instead this threshold can be moved to $1000 if the additional validation process capabilities are present and used, because the communication from the user's mobile device is more trustworthy as the DTVV value is generated dynamically with additional verification, instead of a static value that can simply be read off of an image of a plastic card, for example.

Figure 2:
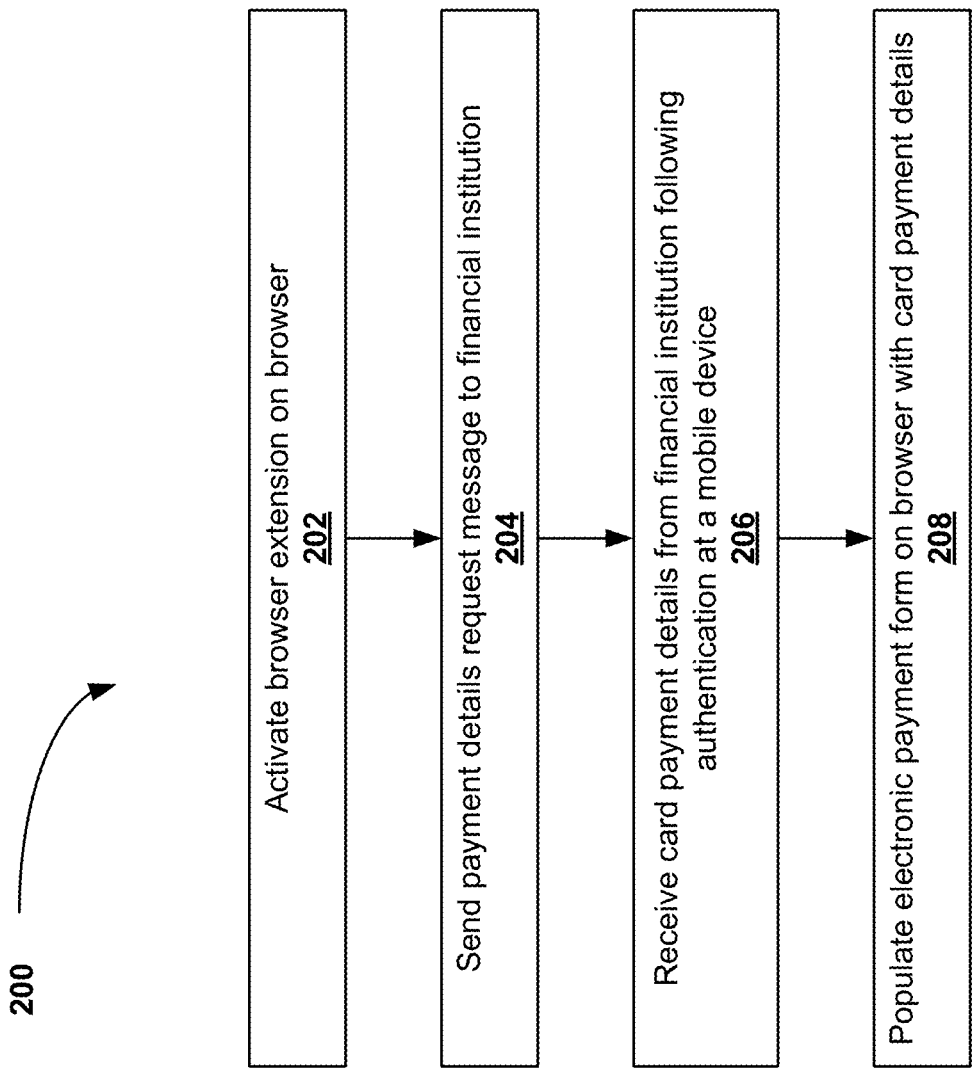
FIG. 2 illustrates, in a flowchart, an example of a method of populating electronic payment credentials, in accordance with some embodiments.

FIG. 2 illustrates, in a flowchart, an example of a method of populating electronic payment credentials 200, in accordance with some embodiments. The method 200 may be performed in a browser extension on a first device. When a user has selected an item for electronic purchase on a browser, an electronic payment form may be presented for payment. The form may include fields for card payment details. For example, a credit card payment form may include field for the user to populate a card number, expiry date and a card verification value (CVV). Other payment methods may request the same, different, fewer or additional payment details. Such payment details may be stored in a wallet or electronic payment application on a mobile device. The user may activate/initiate 202 a browser extension 125 on the browser 120. The browser may then send 204 a payment details request message to the financial institution 160. In some embodiments, the request message may be authenticated following a quick response (QR) code scan by the mobile device of a QR code displayed by the browser 120. In some embodiments, a wallet/payment application 140 may be registered and linked to the browser extension 125 such that the browser extension 120 may send the request directly to the financial institution 160 upon activation 202. Once the payment details are received 206 from the financial institution 160, the details may be automatically populated 208 in the browser for the user. Other steps may be added to the method 200.

The populating of payment credentials 200 may further include data sets that include, for example, API secrets, keypairs (e.g., symmetrical or asymmetric), keys, certificates, among others. In a further embodiment, during the registration process, the secure data sets include a handshaking procedure whereby a unique identifier of the GUI extension software module (e.g., an installation code or a hash generated during initialization) is exchanged with the backend server that can be used for future authentications of the GUI extension software module.

An example handshaking procedure can include initializing the unique identifier during a provisioning step, such as a randomly generated nonce generated using a hash value of a timestamp of when the GUI extension software module instance was installed on a device, and then generating a derived token that is sent to the backend server of the financial institution 160 during initial set up. The derived token, in some cases, can simply be the identifier itself in plaintext, or in some embodiments, is a token that is signed using the identifier or a derivative nonce that is generated using the identifier.

In another variation, the derived token is a keypair generated by the GUI extension software module during initialization, and a public key is registered in the backend server. The private key is stored on a device keychain for example, and when the backend receives a request from the GUI extension software module, the request is signed by the GUI extension software module private key, such that the backend server can compare the earlier saved public key to validate the GUI extension software module.

The token is used to bind the backend server and the GUI extension software module instance, such that the backend server is able to authenticate any messages sent by the GUI extension software module by comparing against the derived token (e.g., by checking whether a signature is valid, or requesting the identifier as a gatekeeping mechanism). Accordingly, the use of this derived token aids in preventing malicious GUI extension software module instances from masquerading as a legitimate instance.

The data sets can further include tokenization information of a particular secure credential associated with the user, such as a tokenized variant of the user's payment credentials. In a further embodiment, the tokenized variant of the user's payment credentials is generated specifically for the GUI extension software module such that it is bound to a particular instance of GUI extension software module.

The GUI extension software module operates alongside a browser or a rendering engine of a mobile application, for example, executable as a browser extension that is loaded during operation of the browser or rendering engine.

The binding effectively establishes public key infrastructure between the user's mobile device and the backend, for example, providing an enhanced mechanism where the user is able to take pre-registration steps where they register for "quick secure pay". During the binding process, a key generation ceremony can be used to create a public/private key pair. The device stores the private key in the enclave, and passes the public key to the server. In some embodiments, this communication is conducted using a nonce-protected secure channel for additional security.

Whenever the user's mobile device transmits a request message for the credentials from the backend, the backend expects the device to answer a challenge. The private key can be configured to never leave the device or to be transmitted on any message, and rather, in some embodiments, a biometric verification or other secure verification is used to control secure access to the private key on the device itself. The server has the public key, and can verify signed messages. Accordingly, the user's mobile device, when authorized through the biometric verification or other secure verification, can be controlled to send a correctly configured message requesting the DTVV to the backend.

The signed message can include a random alphanumeric nonce that's generated on the backend side. The signed message could, for example, include a JWS (JSON web signature). In some embodiments, the nonce can be transaction specific and generated by the payment processor, but other variations are possible, such as having a merchant specific nonce, a time-related nonce, a permanent nonce, etc.

Figure 3:
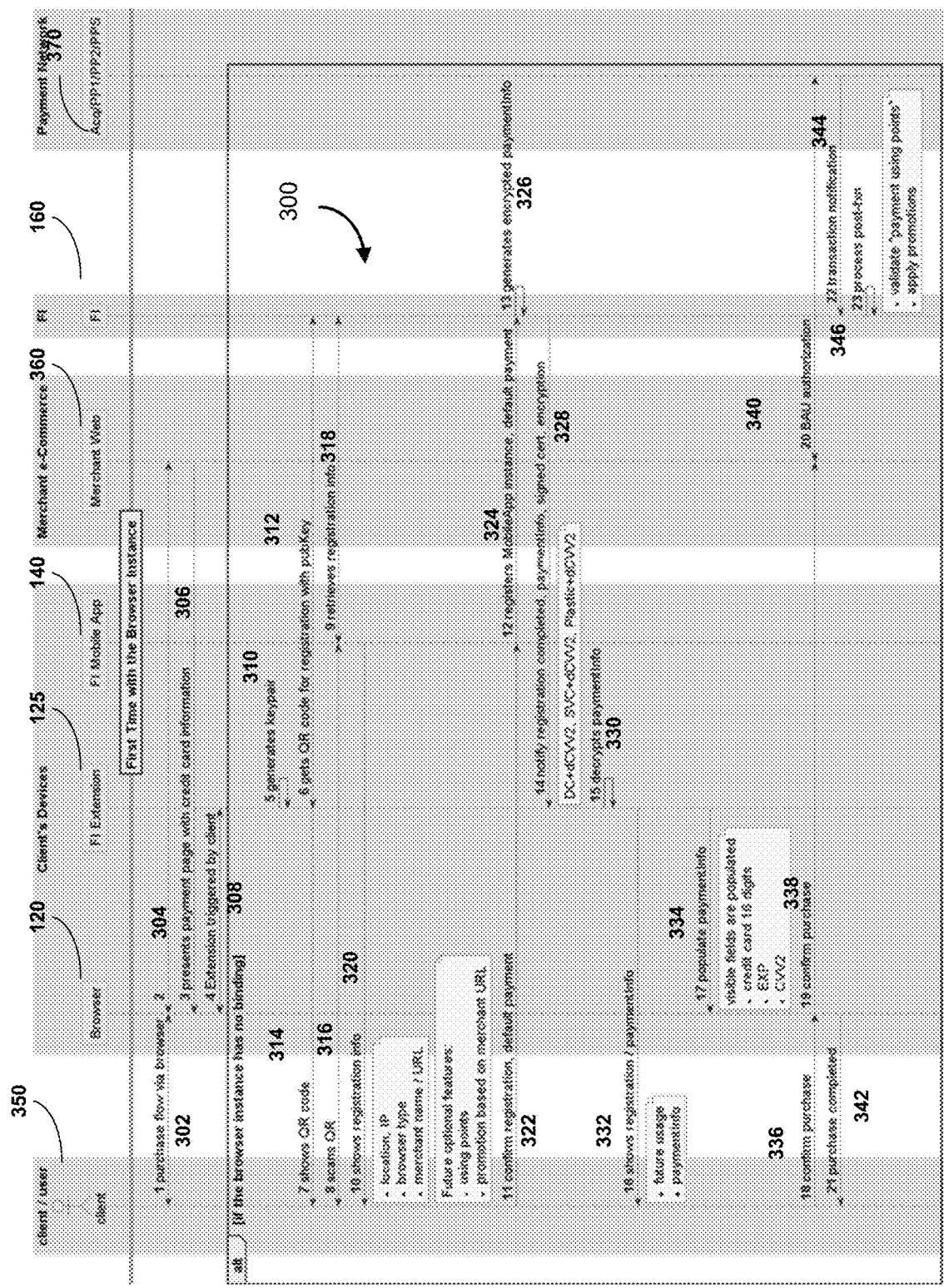
FIG. 3 illustrates, in a call-flow diagram, an example of a method of electronic payment, in accordance with some embodiments.

FIG. 3 illustrates, in a call-flow diagram, an example of a method of electronic payment 300, in accordance with some embodiments. The method 300 involves a browser extension with QR and push notification with no integration with a merchant system. The method 300 is performed in a first interaction of the browser instance. A client 350 may interact with a browser 120 for a purchase flow 302, 304 between the browser 120 and merchant web 360. The merchant web 360 may present a payment page with payment card (e.g., credit card) information fields to be filled in by the user 350. The user may trigger 308 the browser extension 125. It should be understood that while credit card payment details are described herein, other forms of payment may be used.

The GUI extension software module operates in this flow by processing or intercepting incoming and out-going rendering code and input commands, and can interject or inject code or entries into incoming or out-going rendering code and commands. Accordingly, the system can operate merchant page agnostic while improving security features through improved usage of dynamic credentials on the backend server as described in various embodiments herein.

For example, the GUI extension software module can automatically fill and/or populate electronic payment credentials.

The GUI extension software module can be utilized for detection of a state of a purchase, and can be configured for being triggered upon detection of a particular state. For example, the GUI extension software module detects that the user is at a merchant checkout rendering flow or screen, and the overlay mechanism can be triggered at this point. The overlay mechanism can be utilized to render additional visual interactive controls, such as buttons, input screens, trigger biometric inputs, among others, which can be utilized, for example, to log into additional accounts, provide additional layers of security and authentication, among others.

In some embodiments, the browser extension is configured to recognize that this website has this additional layer of security (e.g., level 2 security), and the browser extension itself can be configured to make a call to the backend to request a nonce in anticipation of an upcoming payment message flow. In some embodiments, the request for a nonce or DTVV occurs earlier earlier in a transaction flow—once the user is detected to be starting the checkout in the browser. This can be conducted in different variations, for example, where the website has built-in hooks to be identified indicating that a checkout is starting, where the payment provider, as part of the check out process, indicates that it is DTVV capable or is on a whitelist indicating that it is DTVV capable, etc. A benefit of the approach proposed herein is the ability to be backwards compatible with websites that are adapted to work with static verification codes during the checkout process.

By adding in an additional technical layer and PKI messaging, the code on the browser extension augments the capabilities of the browser and the website for improved security for verifying the transaction, without requiring any modifications on a merchant's end or on the check out website.

When the browser extension is loaded, the capability to interact with DTVVs can be built-into the browser extension code and advertised to the backends and/or the websites, to seamlessly and automatically allow for increased security integration. In some embodiments, the pre-registration step changes a state variable that is exposed to the websites when interacting with the user's mobile device/browser indicating that the device is pre-registered and bound for quick secure payments.

In this variation, the backend communicates with the browser extension to generate and transmit the nonce, a biometric verification can be used to unlock key storage, and the the keychain has certain tokens that can include or otherwise access rewards information, etc. The key storage can reside upon or otherwise be protected by a protected enclave, for example, where the key storage is maintained on separate but coupled hardware or software (e.g., segregated memory regions) where the coupling mechanism has increased security to reduce the propensity of exposure to malicious actors. For example, in some embodiments, the enclave is a memory region or memory chip that is stored away and cannot interact with the regular memory region of the user's mobile device, and can only be interacted with through defined interface controls limiting and prescribing formats of communications such that certain information, such that certain information, such as the raw private key, are never accessible and thus never exposed. Rather, the raw private key can only be used for operations to generate an output, such as a signed or encrypted message that can be verified only using the corresponding public key.

The public key pair is used to exchange secret (AES) keys and those are used to encrypt and decrypt messages. Even these AES keys can be stored in the secure hardware. The private keys can only be used for signing and decrypting, and public key is used for encrypting.

If the browser instance has no binding to a mobile wallet/payment application 140, then the browser extension 125 may generate 310 a keypair, and receive 312 a QR code for registration with the public key. The QR code is displayed 314 to the user 350. In some embodiments, the QR code may be displayed in a pop up window. The user may use its mobile to scan 316 the QR code. Registration information pertaining to the user 350 is retrieved 318 from a financial institution. The registration information may be displayed 320 to the user 350 on a display of the mobile device 130. In some embodiments, the registration information may include location, internet protocol, browser type, merchant name, merchant universal resource locator (URL). In some embodiments, the details may include points or rewards, and promotions based on the merchant URL.

The user 350 may confirm and/or approve the registration on the mobile device 130 and issue a default payment 322. The mobile application 140 instance and default payment is registered 324 with the financial institution 160. The financial institution 160 may then generated encrypted payment information 326 and notify 328 the browser extension 125 that the registration is completed, the payment information, and a signed certificate encryption. In some embodiments, the mobile device application 140 may display an option for the user 350 to link the wallet 140 to the browser extension 125 for future secure and faster processing. The browser extension 125 may then decrypt 330 the payment information and display 332 the payment information. The browser extension 125 may also populate 334 the payment information in the browser 120, including if the wallet 140 is now linked to the browser extension 125. In some embodiments, for a credit card payment form, the credit card number, expiry date and CVV may be auto-populated from the decrypted payment information. In some embodiments, if payment information for a payment type that is different from payment type represented by the online form on the browser 120, the browser extension 125 may refresh the browser 120 to display a different payment form. The user 350 may then confirm 336 the purchase which causes the browser 120 to send a confirm purchase message 338 to the merchant web 360. An authorization message 340 may be given by the payment network 370. The browser 120 may then display 342 that the purchase was completed. The payment network sends a transaction notification message 344 to the financial institution 160 that then processes and posts the transaction 346. Other steps may be added to the method 300, such as validating the payment using points, or applying promotions. In some embodiments, the payment information may be for a new payment instrument that could be managed via time limits, number of uses or other restrictions.

The GUI extension software module, during this process, utilizes the stored data sets and interjects into the checkout process by entering the user's checkout credentials as required for the merchant checkout flow or screen, such as inputting in information such as credit card number, expiry dates, addresses, names, among others. In some embodiments, the GUI extension software module is also configured to establish a secure channel with the backend server during this process to obtain dynamic information about the token, which can include dynamic time-varying or instance-varying fields that are used to autofill the payment credentials. In some embodiments, the dynamically obtained information that is obtained in real-time or near-real time is programmatically generated for the specific transaction or available only for a particular time period such that security can be enhanced for the transaction without requiring a modification of the merchant payment flow. The dynamic information can thus be provided and utilized as part of a real-time or near-real time dynamically generated cryptogram.

In some embodiments, the process to obtain the dynamically obtained information may require an additional security handshake message flow where the URL of the merchant flow is also incorporated into the security handshake to increase security of the process.

The GUI extension software module is provided by a computer system that comprises at least one processor and a memory storing instructions which, when executed by the processor, configure the processor to receive a browser extension activation input, send payment details request message(s) to a financial institution system (e.g., the backend server), receive payment details from the financial institution system following authentication at a mobile device, and populate a payment form on the browser using the payment details. Using a dynamically generated cryptogram is advantageous as security is improved without unnecessarily burdening or modifying the payment flow, and can also be used for merchant websites which are not adapted for providing a higher level of security.

Figure 4:
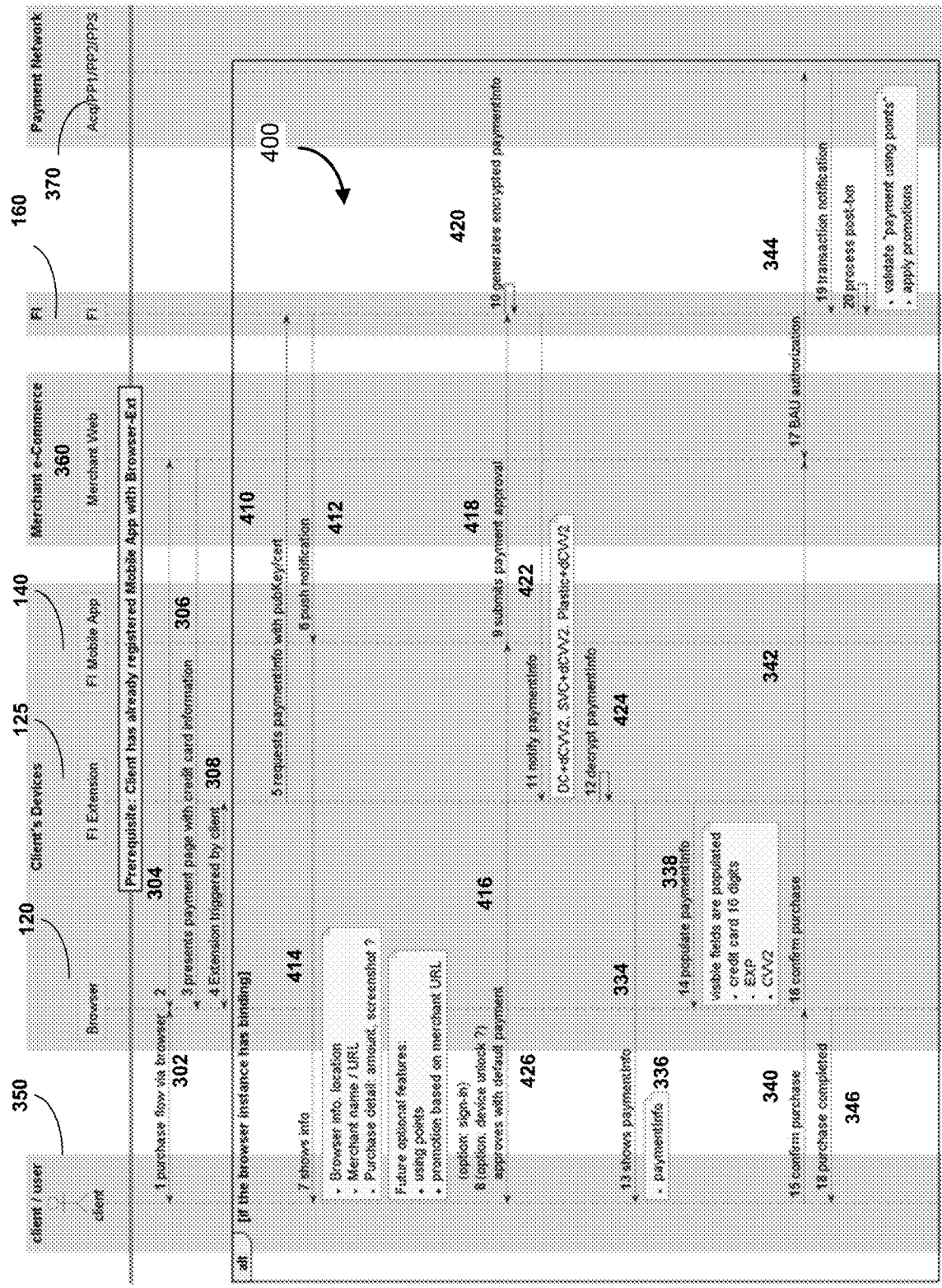
FIG. 4 illustrates, in a call-flow diagram, another example of a method of electronic payment, in accordance with some embodiments.

FIG. 4 illustrates, in a call-flow diagram, another example of a method of electronic payment 400, in accordance with some embodiments. The method 400 involves a browser extension with QR and push notification with no integration with a merchant system. The method 400 is performed when the client 350 has already registered its mobile application 140 with the browser extension 125. A client 350 may interact with a browser 120 for a purchase flow 302, 304 between the browser 120 and merchant web 360. The merchant web 360 may present a payment page with payment card (e.g., credit card) information fields to be filled in by the user 350. The user may trigger 308 the browser extension 125.

If the browser instance has binding to a mobile wallet/payment application 140, then the browser extension 125 may request the payment information with public key/certificate 410. The financial institution 160 may issue a push notification message 412 to the mobile application 140, which then may display 414 the payment information. In some embodiments, the payment information may include browser information, location, merchant name, merchant URL, and purchase details such as payment amount, screenshots, etc. In some embodiments, the details may include points or rewards, and promotions based on the merchant URL.

The user 350 may approve a purchase using default payment details 416 (including optionally, sign-in, mobile device unlock, or other authentication performed at the mobile device). The mobile application 140 may then submit the payment for approval 418 from the financial institution 160. The financial institution 160 may then generated encrypted payment information 420 and notify 422 the browser extension 125 of the payment information. The browser extension 125 may then decrypt 424 the payment information and display 426 the payment information. The browser extension 125 may also populate 334 the payment information in the browser 120. For example, for a credit card payment form, the credit card number, expiry date and CVV may be auto-populated from the decrypted payment information. The user 350 may then confirm the purchase which causes the browser 120 to send a confirm purchase message to the merchant web 360. An authorization message 340 may be given by the payment network 370. The browser 120 may then display 342 that the purchase was completed. The payment network sends a transaction notification message 344 to the financial institution 160 that then processes and posts the transaction 346. Other steps may be added to the method 400, such as validating the payment using points, or applying promotions.

Figure 5A:
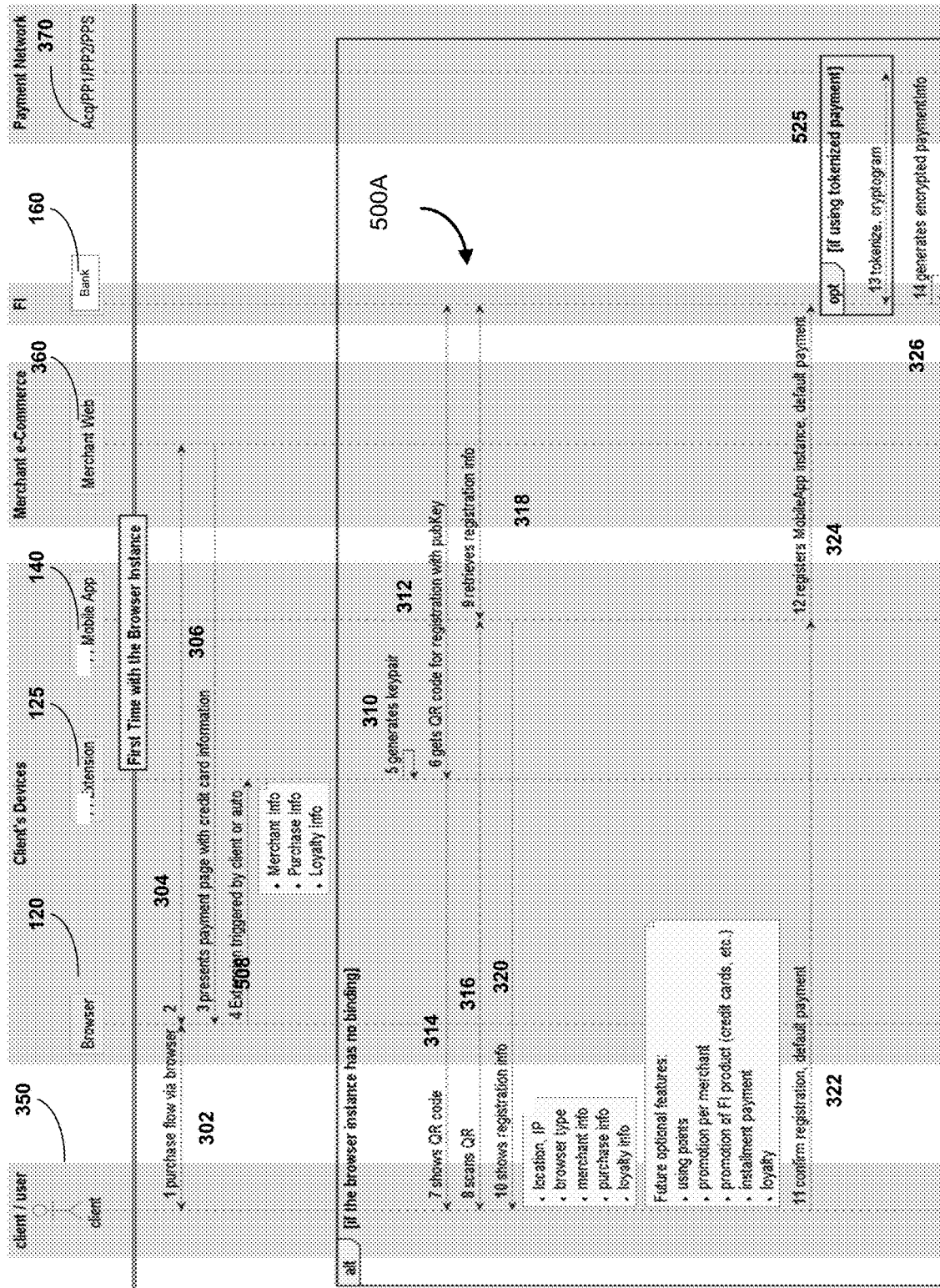
FIG. 5A and FIG. 5B illustrates, in a call-flow diagram, another example of a method of electronic payment, in accordance with some embodiments.
Figure 5B:
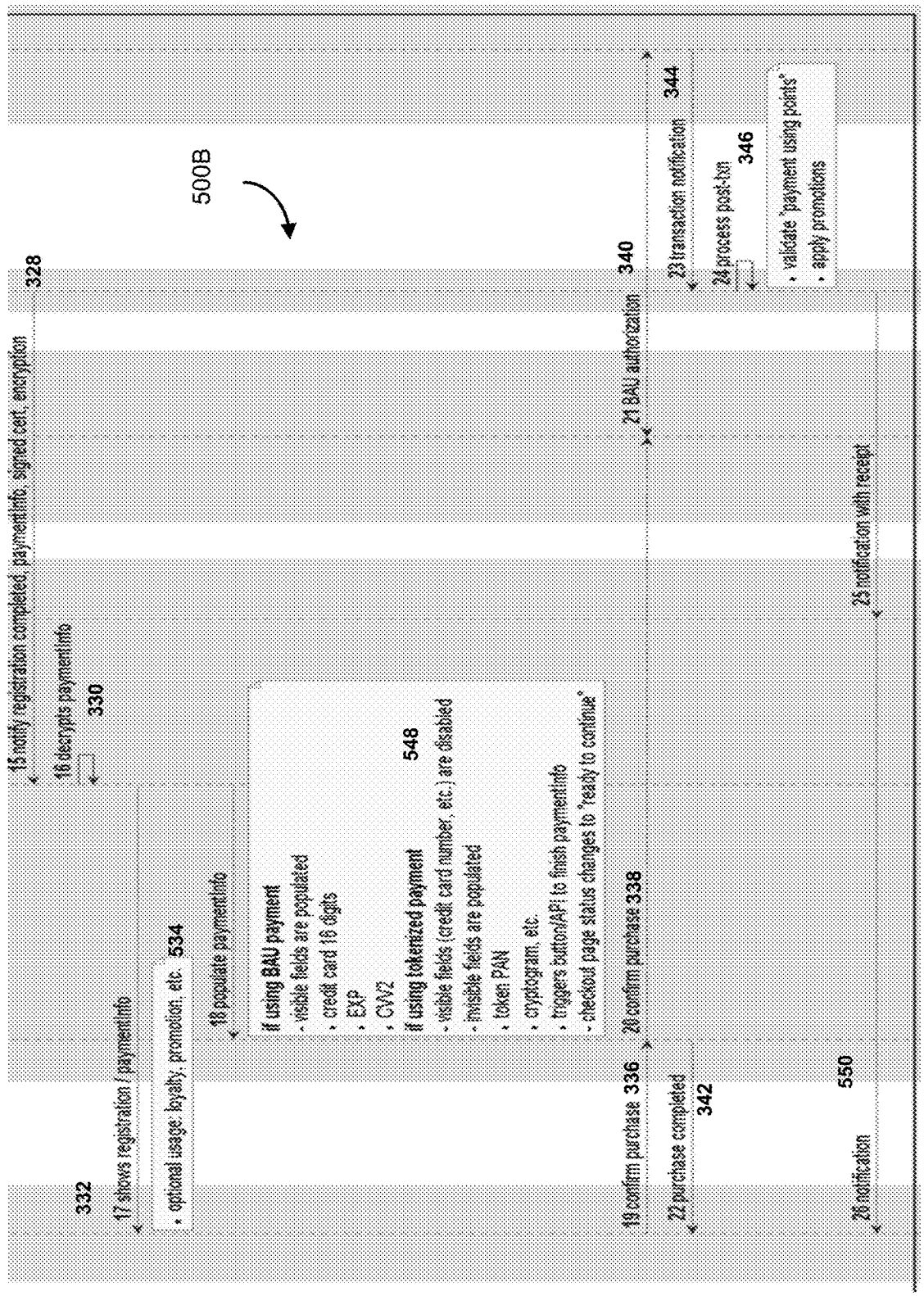

FIG. 5A and FIG. 5B illustrates, in a call-flow diagram, another example of a method of electronic payment 500A and continued as 500B, in accordance with some embodiments. The method 500 involves a browser extension with QR and push notification with integration with a merchant system. The method 300 is performed in a first interaction of the browser instance. A client 350 may interact with a browser 120 for a purchase flow 302, 304 between the browser 120 and merchant web 360. The merchant web 360 may present a payment page with payment card (e.g., credit card) information fields to be filled in by the user 350. The browser extension 125 may be triggered 508 by the user, or automatically. Merchant information, purchase information and/or loyalty information may be included. Thus, the browser extension 125 may include merchant information and payment type in its payment information request to the financial institution 160. In some embodiments, options for the payment type may be provided by the browser extension 125 to the browser 120 and/or the mobile device 130 to allow the user 350 to select the payment type. In some embodiments, the payment type may be selected based on the merchant (e.g., with merchants associated with a payment type or preferred payment type options).

If the browser instance has no binding to a mobile wallet/payment application 140, then the browser extension 125 may generate 310 a keypair, and receive 312 a QR code for registration with the public key. The QR code is displayed 314 to the user 350. The user may use its mobile to scan 316 the QR code. Registration information pertaining to the user 350 is retrieved 318 from a financial institution. The registration information is displayed 320 to the user 350. In some embodiments, the registration information may include location, internet protocol, browser type, merchant information, purchase information and loyalty information. In some embodiments, the details may include points or rewards, and promotions based on the merchant URL, promotion of financial institution product (e.g., credit cards, etc.), installment payments, and loyalty programs.

The user 350 may confirm the registration and issue a default payment 322. The mobile application 140 instance and default payment is registered 324. Optionally, if tokenized payment is being used, then the financial institution may generate 525 a token or cryptogram using the payment network 370 protocols. The financial institution 160 may then generated encrypted payment information 326 and notify 328 the browser extension 125 that the registration is completed, the payment information, and a signed certificate encryption. The browser extension 125 may then decrypt 330 the payment information and display 332 the payment information. Optionally, loyalty program information and promotions may be displayed. The browser extension 125 may also populate 334 the payment information in the browser 120. For example, if BAU payment is being used, then credit card payment form visible fields are populated with the credit card number, expiry date and CVV. If tokenized payments are being used, then visible fields (e.g., credit card number, etc.) are disabled and invisible fields are populated with, for example, a token primary account number (PAN) or a cryptogram, and an application programing interface (API) may be triggered to complete the payment information. A checkout page status may be changed to "ready to continue". The user 350 may then confirm the purchase 336 which causes the browser 120 to send a confirm purchase message 338 to the merchant web 360. An authorization message 340 may be given by the payment network 370. The browser 120 may then display 342 that the purchase was completed. The payment network sends a transaction notification message 344 to the financial institution 160 that then processes and posts the transaction 346. The financial institution 160 may then send a notification with receipt 548 to the mobile application 140, which may then display a notification 550 to the user 350. Other steps may be added to the method 500, such as validating the payment using points, or applying promotions.

Figure 6A:
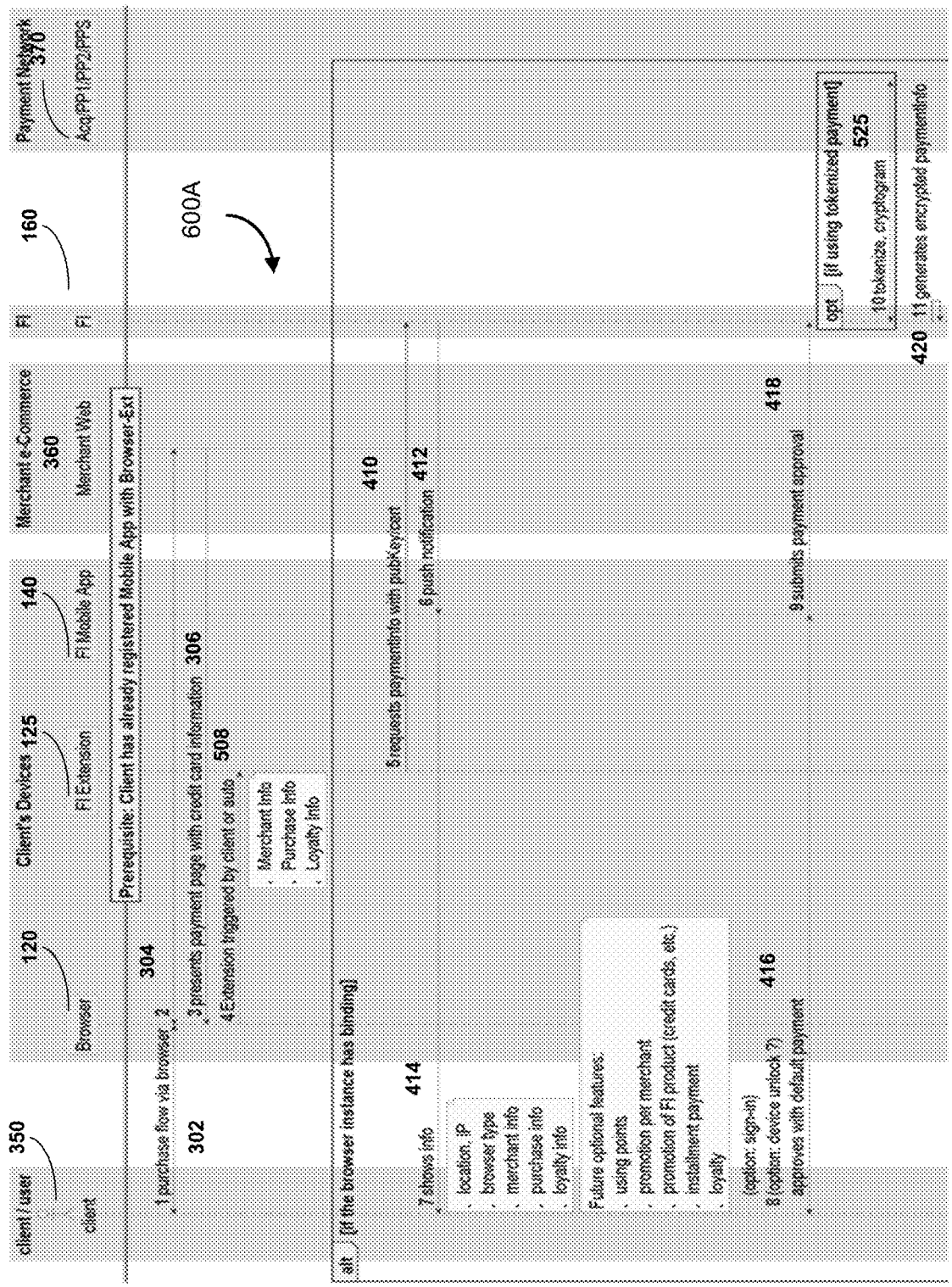
FIG. 6A and FIG. 6B illustrates, in a call-flow diagram, another example of a method of electronic payment, in accordance with some embodiments.
Figure 6B:
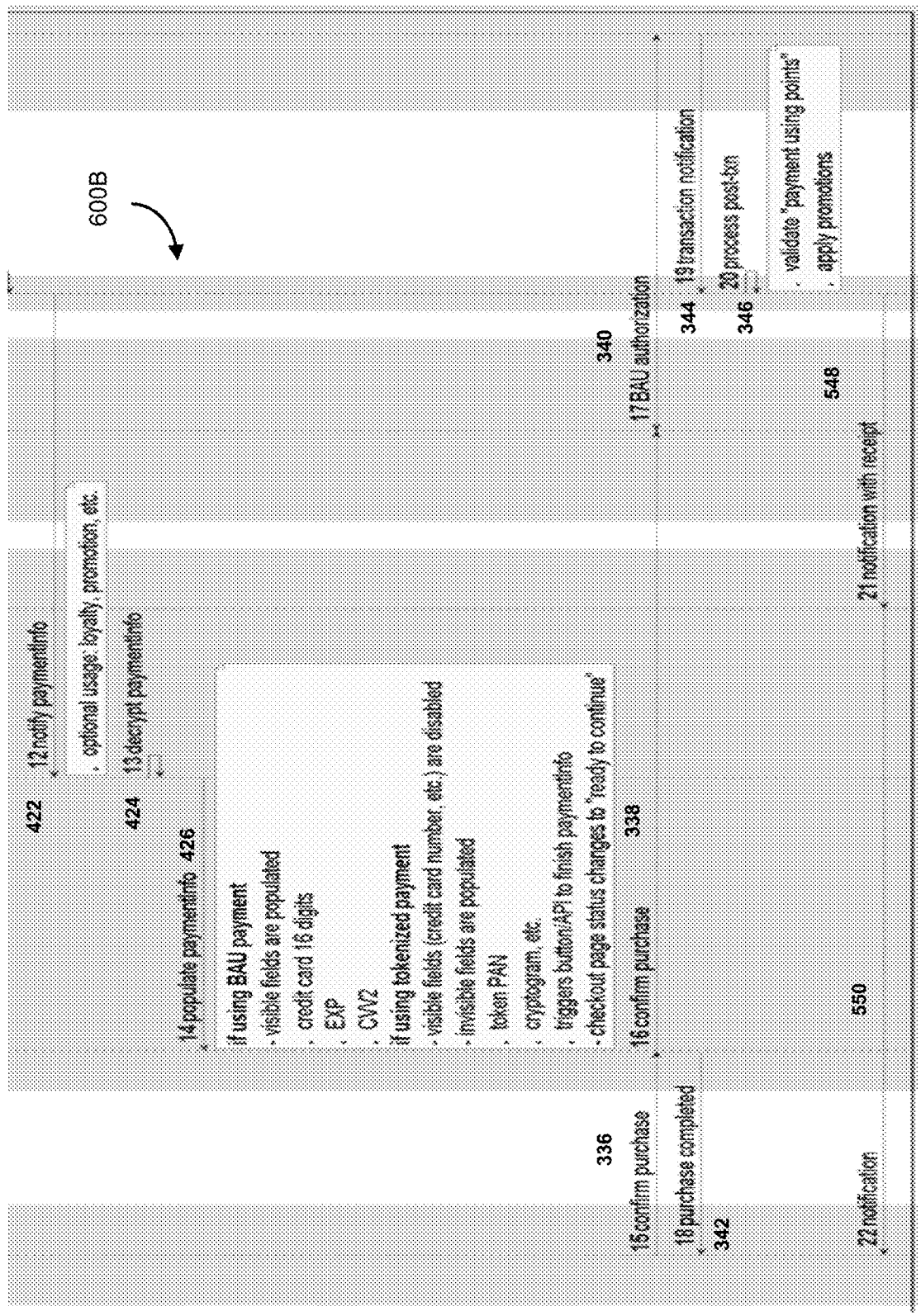

FIG. 6A and FIG. 6B illustrates, in a call-flow diagram, another example of a method of electronic payment 600A and continued as 600B, in accordance with some embodiments. The method 600 involves a browser extension with QR and push notification with integration with a merchant system. The method 600A, 600B is performed when the client has already registered its mobile application 140 with the browser extension 125. A client 350 may interact with a browser 120 for a purchase flow 302, 304 between the browser 120 and merchant web 360. The merchant web 360 may present a payment page with payment card (e.g., credit card) information fields to be filled in by the user 350. The browser extension 125 may be triggered 508 by the user, or automatically. Merchant information, purchase information and/or loyalty information may be included.

If the browser instance has binding to a mobile wallet/ payment application 140, then the browser extension 125 may request the payment information with public key/ certificate 410. The financial institution 160 may issue a push notification message 412 to the mobile application 140, which then may display 414 the payment information. In some embodiments, the registration information may include location, internet protocol, browser type, merchant information, purchase information and loyalty information. In some embodiments, the details may include points or rewards, and promotions based on the merchant URL, promotion of financial institution product (e.g., credit cards, etc.), installment payments, and loyalty program.

The user 350 may approve a purchase using default payment details 416 (including optionally, sign-in, mobile device unlock, or other authentication performed at the mobile device). The mobile application 140 may then submit the payment for approval 418 from the financial institution 160. Optionally, if tokenized payment is being used, then the financial institution may generate 525 a token or cryptogram using the payment network 370 protocols. The financial institution 160 may then generated encrypted payment information 420 and notify 422 the browser extension 125 of the payment information. In some embodiments, this includes displaying loyalty program information and promotions. The browser extension 125 may then decrypt 424 the payment information and display 426 the payment information. The browser extension 125 may also populate 334 the payment information in the browser 120. For example, if a payment is being used, then credit card payment form visible fields are populated with the credit card number, expiry date and CVV. If tokenized payments are being used, then visible fields (e.g., credit card number, etc.) are disabled and invisible fields are populated with, for example, a token primary account number (PAN) or a cryptogram, and an application programing interface (API) may be triggered to complete the payment information. A checkout page status may be changed to "ready to continue". The user 350 may then confirm the purchase 336 which causes the browser 120 to send a confirm purchase message 338 to the merchant web 360. An authorization message 340 may be given by the payment network 370. The browser 120 may then display 342 that the purchase was completed. The payment network sends a transaction notification message 344 to the financial institution 160 that then processes and posts the transaction 346. The financial institution 160 may then send a notification with receipt 548 to the mobile application 140, which may then display a notification 550 to the user 350. Other steps may be added to the method 400, such as validating the payment using points, or applying promotions.

Figure 7:
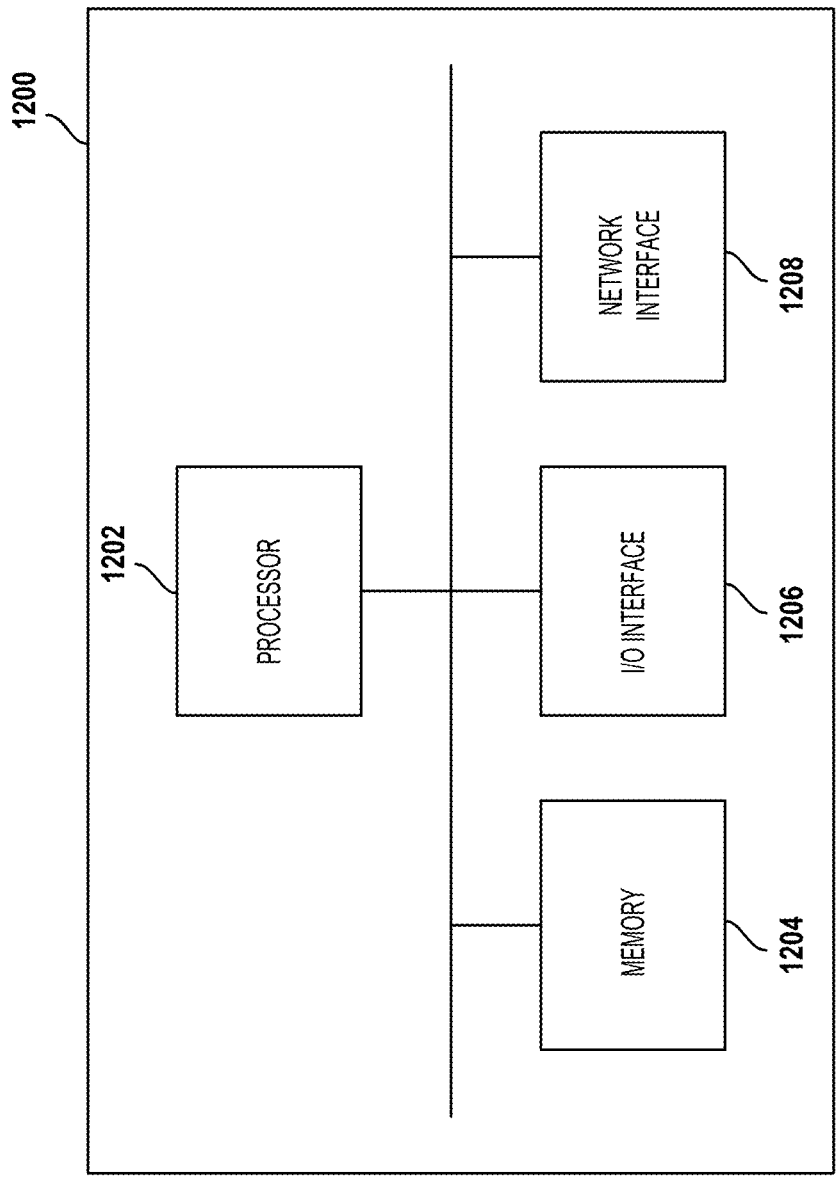
FIG. 7 is a schematic diagram of a computing device such as a server.

FIG. 7 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Figure 8:
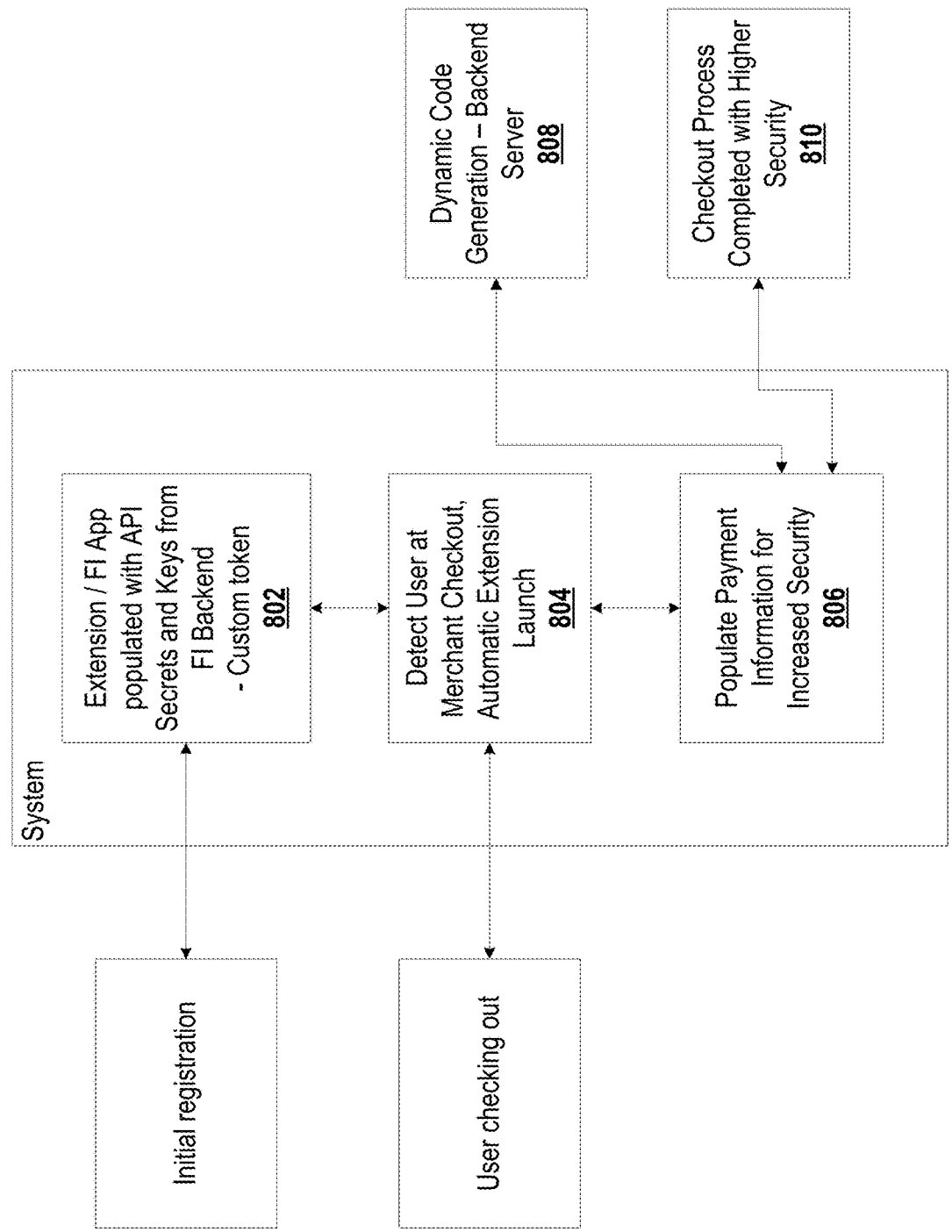
FIG. 8 is an example method diagram showing an example approach for an improved security automatic data entry mechanism for operation on a web page, according to some embodiments.

FIG. 8 is an example method diagram showing an example approach for an improved security automatic data entry mechanism for operation on a web page, according to some embodiments.

In diagram 800, during an initial registration process 802, the extension and/or an application are populated with API secrets and keys from the backend server. The population process can include further binding handshake messages so that the backend server is capable of re-authenticating the instance of the extension or of the application (or both). In some embodiments, a custom token is generated for each payment card or credential data set being used in respect of the GUI extension software module. The token can be a child token spawned from a parent card or account, such that a GUI extension software module-specific token is generated. Re-authenticating the instance of the extension could also apply to authenticating a different/future instance, similar in a manner that the binding is described for future usage below in an embodiment.

Approaches for generating these customized tokens can include using the unique identifier of the GUI extension software module, appending it onto the parent card credential, and then using a hash mechanism to generate a practically unique code. For example, if the unique identifier is AC987281FE, and the card number is 1234567891234, it can be generated as hash (1234567891234 AC987281FE), and registered on the payment processor through the backend server.

In some embodiments, the unique tokenized credential can also be bound to the GUI extension software module specifically on the backend server such that only authenticated requests from GUI extension software module can only interact with the tokenized data credential account.

In some embodiments, the customized token for a specific payment credential may also be linked with specific URLs or merchant sites such that the customized token can only be used for those types of purchases or only for purchases at those particular URLs (e.g., whitelisted URLs). The whitelisted URLs can be used not only for security, but also for tracking available coupons and offers. For example, a database connection may be utilized to conduct a lookup against coupon and offer-enabled URLs to surface a coupon or offer on the hybrid overlay during the checkout process.

The GUI extension software module tracks state information of the user through the browsing and/or traversal of webpages or mobile application pages by processing inputs and rendering code intercepted from the browser. The GUI extension software module can determine at 804, for example, that the user is entering a checkout state, and launch the extension overlay. This determination, for example, can be conducted heuristically through tracking and generating a confidence score for a particular state through analysis of incoming code, or in another embodiment, the determination is conducted through tracking that the user has entered a particular checkout URL or has sent in particular inputs (e.g., HTTP GET/POST) indicative of a checkout page or a shopping cart module.

In some embodiments, the generation of the DTVV and/or the set up of the secure communication channels may be subject to an amount of processing delay and/or communication delays, as computationally expensive cryptographic approaches may be utilized for generation of the DTVV to improve security and/or to establish the secure communications channel.

The DTVV request process, can in some embodiments, include the communication of signed messages from the mobile device (including the nonce) that request the DTVV. The backend, upon receiving and verifying/validating the message, sends back a DTVV that can be generated in real-time or generated in near-real time (e.g., as noted in the variant above where the DTVV generation process is initiated at an earlier page navigation to account for processing delays in DTVV generation). The processing delay in DTVV generation, for example, can be due to increased security approaches for DTVV generation, such as hardware-based generation that includes injected entropy. Entropy injection can include the use of sophisticated random number generator mechanisms, including the establishment of computational seeds using difficult to ascertain data, such as, for example, temperature readings at a particular time, generations from TPMs (trusted platform modules), interrupt timings, etc. A challenge with entropy injection techniques is that they can be slow and thus a small lead time may be useful to avoid slowing down the check out process as much as possible.

For example, when the user starts the check out process, in a variant approach, the transition from shopping cart to the check out information pages may be determined through parsing the webpage source HTML information by the browser extension. The transition can be explicitly stated (for example, with a comment line or other indicator in the code itself), or can be heuristically determined (e.g., a shift towards higher security communication protocols, parsing rendered text to track usages of the word tokens "payment", "credit card", "check out", "shipping". In this variant approach, the fast secure checkout process can be initiated early to begin establishing secure channels and starting the process at the issuer backend to generate the DTVV so that it is ready for autofill when the user is actually entering the payment information and the DTVV needs to be requested then and autofilled into the input window for the CVV at the merchant website. The generation of the DTVV can, for example, require 5.5 seconds. While the user is still deciding which address to ship to, which carrier to ship on, etc., the DTVV request process could be initiated early, and then finalized during the autofill entry on the final confirmation and payment that occurs 15 seconds later.

When the secure channels are established, both the server and the code on the browser extension can exchange keys (e.g., AES keys), and the DTVV is passed back using the secure channel. In some embodiments, the secure channel can be secured in a variety of approaches such as using AES keys, nonce+key configurations, session-based keys, etc.

Once client confirms payment through selection or interaction with various interface elements, the browser extension is configured to request an additional verification (e.g., biometric verification) to provide access to the secure enclave, which is then used to establish the messages that are used to obtain the DTVV for the specified payment method, which can then be autofilled into the corresponding input field.

Accordingly, in a variant embodiment, the browser extension can be configured to pre-emptively begin the DTVV request process by requesting a nonce before the actual checkout step (e.g., upon navigation to a type of pre-check out page or a shopping cart review page) is initiated so that the secure channel is pre-established, and in some embodiments, the generation of the DTVV process is already started at the backend so that downstream handshaking processes can happen with less delay experienced by the user. In another variant embodiment, the browser extension can be configured to pre-emptively begin the DTVV request process by requesting a nonce when the browser extension itself is initiated on a particular merchant page, using a concordance table or a look up table of payment processors corresponding to particular merchants.

When the user is entering a page where credentials are being entered (e.g., credit card number, name, expiry date, CVV information), the GUI extension software module can be configured to populate payment information to yield improved security at 806. However, the population mechanism further includes communications with a backend server during or proximate to the autofill process at 808, optionally conducting handshake messages for authentication or utilizing binding information for improved authentication. At 808, the backend server provides time-limited information such as a dynamic token verification value (dTVV) or a dynamic card verification value (dCVV) that is generated dynamically on a real-time basis. These dynamic values can be generated using seeds stored on payment processors that neither the backend server nor mobile application/GUI extension software module have access to, improving security in the event that either is compromised. The GUI extension software module auto-populates the information into corresponding fields of the merchant webpage during the checkout process.

In a variant embodiment, as part of the process to request the dynamic information, the GUI extension software module also passes either the GUI extension software module identifier (or token thereof), or the URL, or both, and the backend server and/or the payment processor can validate each of these or both of these against a whitelist or blacklist data structure as an additional layer of security. In a further variant embodiment, the use of whitelist or blacklist data structures can also be utilized to modify a visual rendering of a security or comfort level associated with a particular checkout process. For example, if the URL is verified to be a website that is on the whitelist data structure, a checkmark icon visual representation can be shown, showing the user that this URL is verified and likely trustworthy, and other visual representations can be used for unknown (e.g., those that do not appear on either a blacklist or a whitelist) or potentially malicious websites (e.g., those on a blacklist).

In another variant embodiment, the whitelist or blacklist data structure can be conducted instead at a category level for a particular customized payment token that was instantiated for usage with the GUI extension software module, such as flower shops, electronics retailers, etc. In another embodiment, information such as purchase limits, purchase price ranges, etc., can be established during the initialization process such that the payments are only authenticated when the amount provided corresponds to a particular range (e.g., $80-$100, with a variance for shipping/handling), etc.

In a variant embodiment, the GUI extension software module can interoperate with merchant websites having higher levels of integration with the GUI extension software module API to render coupons and/or offers in concert, for example, based on API hooks directly built into the website code to trigger the launch and operation of the GUI extension software module.

Figure 9:
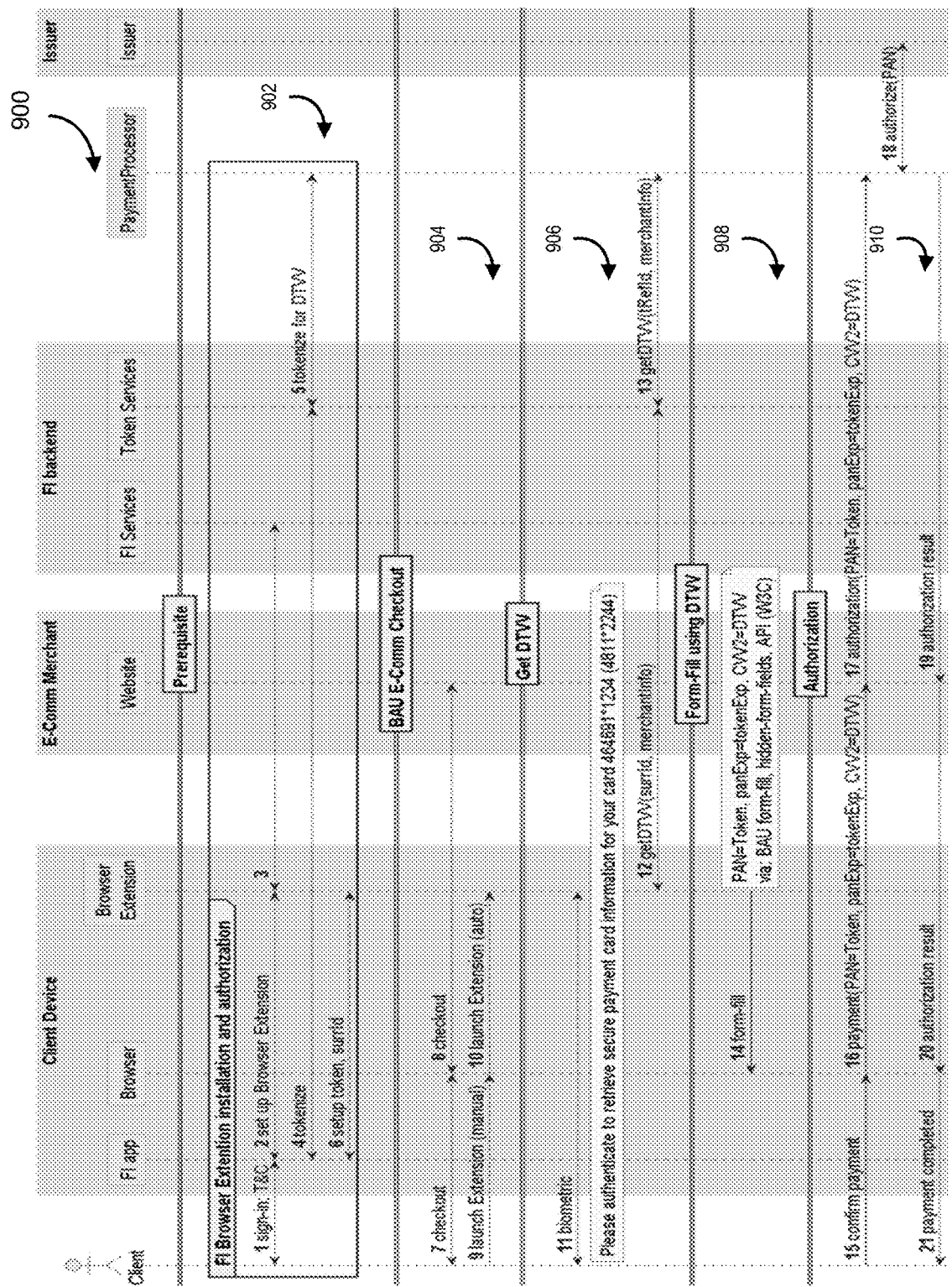
FIG. 9 is a method diagram showing a browser form filling approach using token and cryptogram for OFI cards, according to some embodiments.

FIG. 9 is a method diagram showing a browser form filling approach using token and cryptogram for OH cards, according to some embodiments.

The method 900 depicts a series of steps which are shown as a non-limiting illustrative example. Variation of the steps are possible, in different orders, and with modifications or alterations. As shown in section 902, the browser extension is installed and authorized, and in this initial step, the payment credential token is set up with a payment service provider and bound so that during future usage, a corresponding dynamic value can be obtained. The requesting of the generation of the dynamic value can be conducted asynchronously with the retrieval of the dynamic value. In some embodiments, the dynamic value is triggered for generation at the start of a checkout phase to provide additional time for the dynamic value generation ceremony to be completed in time for a quick and seamless retrieval of the dynamic value at the time of payment/checkout for entry into a webpage field.

In section 904, a series of steps are shown for an e-Commerce check out. BAU stands for business as usual, and in these steps, the merchant's webpage is utilized to render a series of webpage screens representing a purchase journey, culminating in a checkout process. The merchant's website, in some embodiments, does not require additional capabilities—rather, as described in various embodiments herein, it is the browser extension which is configured with additional computational capabilities for interoperation with the backend payment processor to obtain and establish dynamic verification values (DTVV).

During the checkout process at section 906, the GUI extension software module is triggered for operation and begins the autofill process, first requesting a dynamic value after a biometric push from the client, the dynamic value being requested from the backend server (in this example, the DTVV), in real or near real time. The backend server sends a request to the payment processor server, validating the request to obtain the dynamic value. Once the dynamic value is returned, it is provided to the GUI extension software module at 908 for auto population of the form fill field.

After the auto-population of the form fill field is completed, the payment appears to complete through the merchant process as usual for the user. However, for the payment processor systems, the provided credentials can instead be validated in an authorization section at 910 against the generated dynamic value and other validation characteristics (e.g., within time period of generating the value), increasing the security of the transaction and the capability of the payment processor systems to and authenticate/validate the credentials of the purchaser.

In some embodiments, the DTVV is burned for use either permanently or for a period of time for the user, such that a replay attack is prevented from occurring.

In a variant embodiment, the DTVV can be established for a period of time and burned after that time, such that, for example, subsequent purchases for a particular merchant using a particular card can also benefit from the increased security. This is useful for periodic purchases that form part of a pattern for a user, such as purchasing from a stationery merchant which the user is a frequent purchaser from as part of an office supplies purchasing program, or where the user is representing a corporate buyer buying services such as condominium status certificates repeatedly, etc. There can be a default period of time, or a time amount can be requested as part of the initial GetDTVV messages of 906. As noted, the GetDTVV messages of 906 can also include a message field indicating an overall amount of authorization, which can be based, for example, on the total amount identified in the shopping cart, or that amount plus a certain safety margin (e.g., to account for variance in shipping costs). During the authorization step 910, the payment processor/backend server receives the DTVV, and can validate this against the earlier fields associated with the request or generated at the backend limiting the usage of the particular DTVV that is being provided. This can include comparing against a timer that is established at the payment processor/backend server during the generation of the DTVV, or against a total value of transactions that have used the DTVV that is maintained in a data structure that is decremented whenever a transaction is made using the DTVV.

For example, if David wishes to purchase a next-generation console, he may navigate to the merchant website. David's browser extension extends the functionality of his browser, and when he finishes adding items to his shopping cart, the browser extension identifies this transition into a near-finalized payment. At this point, David's browser extension establishes the secure channel with the backend server, and optionally can begin a preliminary DTVV request process using the private key on the secure enclave that causes the initiation of the generation of the DTVV at the payment processor backend. The DTVV request process can pass along the expected value of the items in the shopping cart, and a time-out period (e.g., 30 minutes). The payment processor backend receives this request, and begins the generation process for the DTVV, for example, obtaining pseudorandom seeds and injecting entropy, among others, so that the DTVV autofill process can be faster when it comes time to the autofill. In this example, the DTVV is still generated temporally proximate to the final purchase, but the earlier start time allows for increased DTVV entropy and security (e.g., to reduce the success rates of brute force attacks against the DTVV that utilize tracked DTVVs as an attempt to uncover the underlying cryptographic seeds). The payment processor backend can also couple the generated DTVV to a timer and also a data structure that is decremented each time it is used so that the total purchase price is limited across multiple transactions.

As David navigates across different webpages as part of the checkout, he may select different options for shipping (e.g., how fast, zip code/postal code), and this can change the final purchase amount. At the final checkout pages, David selects the quick secure pay enabled payment option, and the browser extension injects an overlay or graphical interface item that allows the autofill of information, following a successful additional verification check (e.g., biometric). David then provides his verification check data (e.g., face biometric, fingerprint biometric), and the browser extension is now able to access the secure enclave to utilize the bound, pre-registered private key for signing the final DTVV request message. When the DTVV request message is sent across the secure channel by the browser extension, the payment processor backend can optionally use the public key to validate the signature and return the DTVV value across the secure channel or on a separate channel.

As David may have added additional objects as part of the check out process (e.g., controllers, games, extended warranty) or changed the shipping parameters, there could be a discrepancy in price as between the DTVV authorized amount in the request, and this can be compared by the payment processor against a set of logical rules to determine whether this amount is still within an acceptable range.

As noted in the examples above, the DTVV message approach allows for a more granular and tunable approach to improving cybersecurity while avoiding a need for substantial changes to be made at merchant websites. The DTVV approach comes at the cost of additional computational complexity, however, as the secure channel establishment and the generation of the DTVV may be time intensive, especially in resource limited computational environments or in large, scaled environments serving many concurrent computing instances, these steps may be conducted asynchronously in earlier checkout steps so that the DTVV is ready at the final payment step.

The DTVV can also be re-used for a limited period of time or for a limited number or total transaction amount, to further reduce the burden of DTVV generation. In this variation, if the payment processor backend server determines that there is still sufficient time remaining on a previously generated DTVV token (e.g., based on comparing a time threshold against a timer), instead of going through a generation process requiring entropy injection, etc., a previously generated DTVV can be provided instead.

While this approach leads to replay attack vulnerabilities, the time period can be limited to balance the need for convenience and the cybersecurity vulnerability. In some embodiments, the total transaction amount for a DTVV can also be configured to automatically depreciate over time as a function of the expiry time. For example, a new DTVV can have a larger transaction amount available with a greater safety margin relative to the original request, and a near expiry DTVV may automatically be limited to a lower transaction amount.

Figure 10:
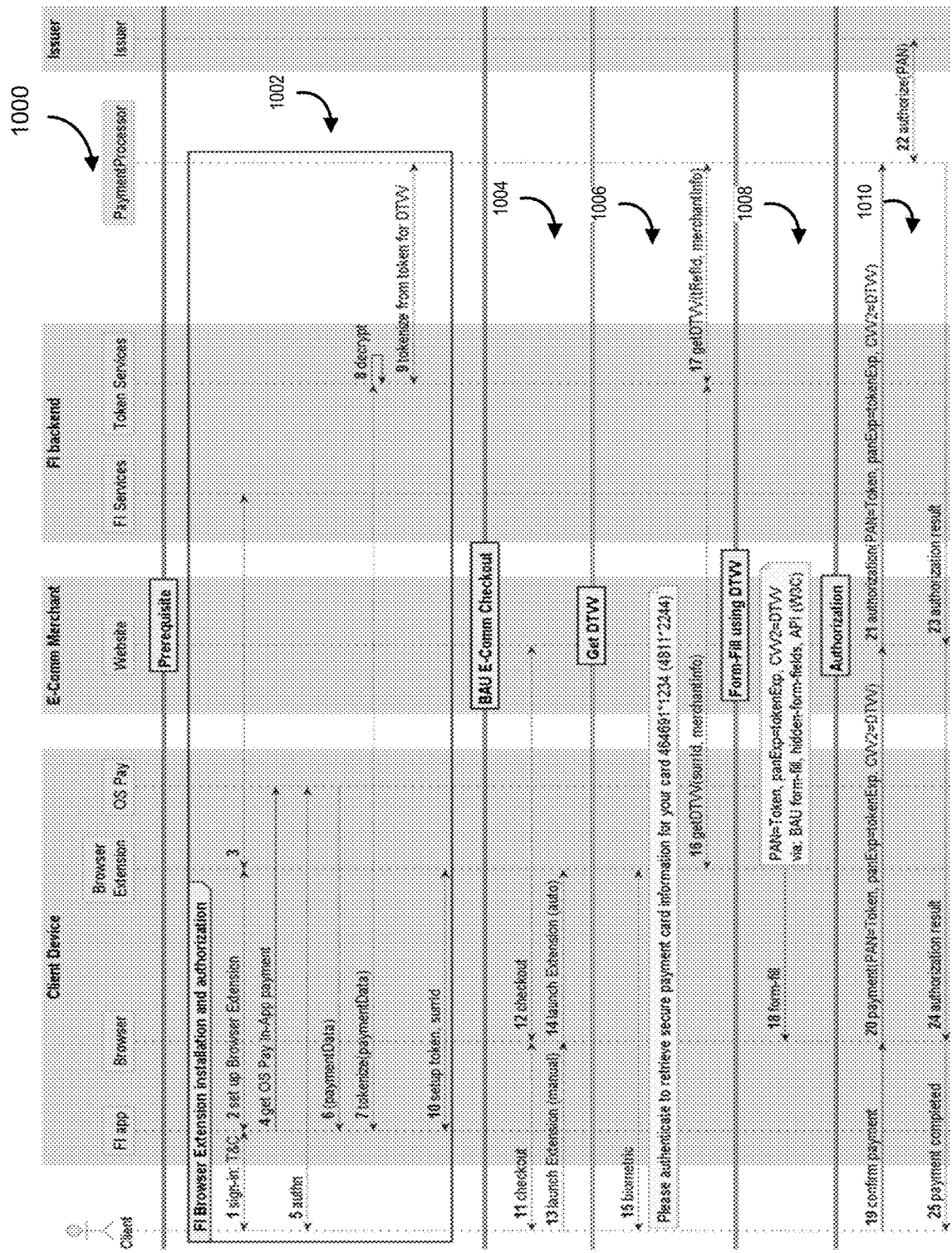
FIG. 10 is a method diagram showing a browser form filling method using token and cryptogram for OFI cards, according to some embodiments.

FIG. 10 is a method diagram showing a browser form filling method 1000 using token and cryptogram for OH cards, according to some embodiments. FIG. 10 is similar to FIG. 9, except the extension installation and authorization step includes getting a portable operating system based In-App payment conducted as part of section 1002. Step portions 1004, 1006, 1008, and 1010 operate similarly to obtain dynamic credentials triggered at the point of the transaction.

Figure 11B:
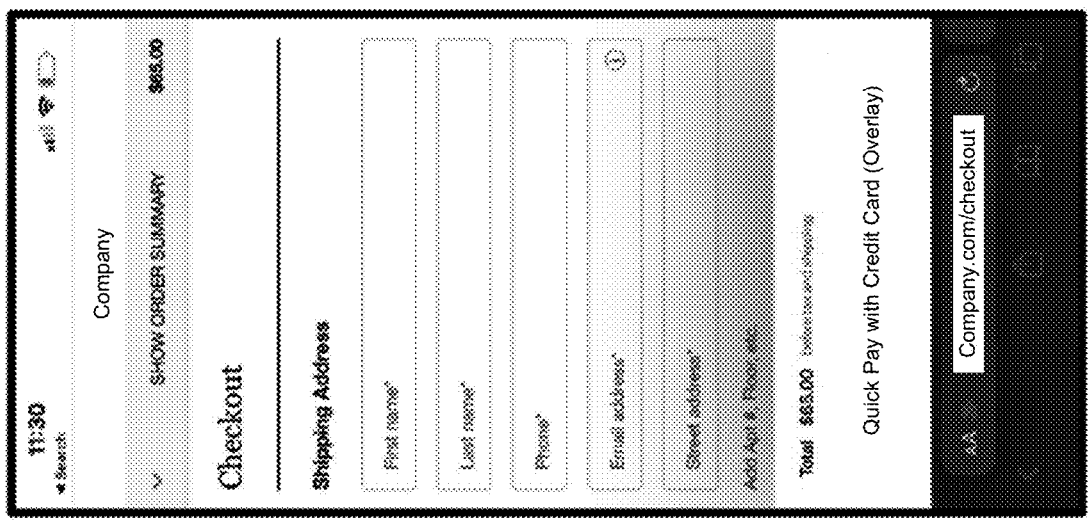
FIG. 11A and FIG. 11B are example merchant webpage renderings, according to some embodiments.
Figure 11A:
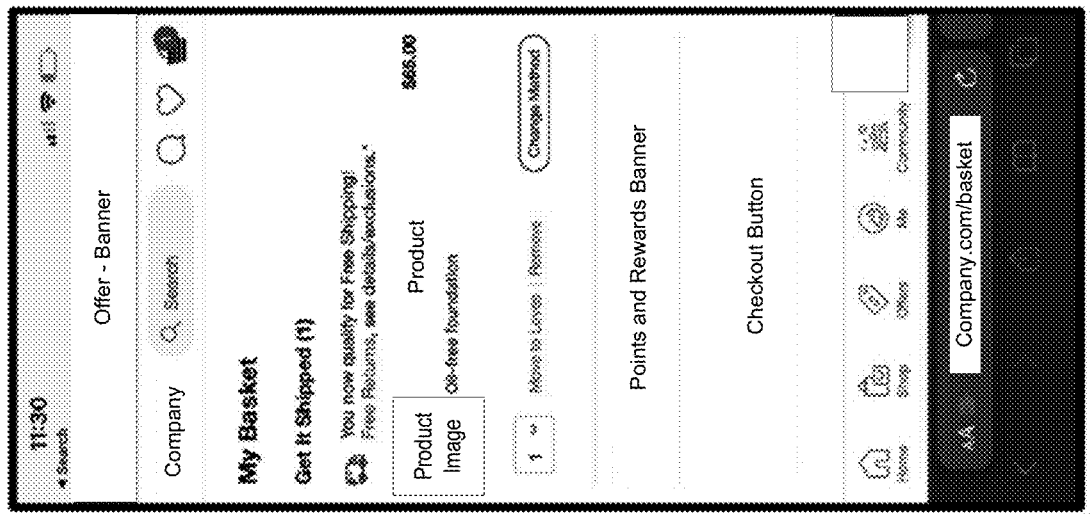

FIG. 11A and FIG. 11B are example merchant webpage renderings, according to some embodiments. In FIG. 11A, a rendering 1100A is shown where a user is about to check out based on items in a virtual shopping basket. In FIG. 11B, a rendering 1100B is shown where the overlay is triggered based on the launch of the extension module, upon a selection of a checkout button (e.g., as tracked through GET/POST commands sent and intercepted by the extension) from FIG. 11A.

At FIG. 11A, when the browser extension is invoked, for example, through the generation of browser extension visual interface elements, the browser extension can be configured to simultaneously pre-emptively begin various DTVV generation processes and steps, for example, asynchronously requesting the payment processor backend server to begin generating a DTVV that, a few pages later, for example, at FIG. 12B, it can be obtained to appear as if it was generated in "real time", whereas it was actually requested for generation several pages earlier in the process to effectively give a lead time to the payment processor backend server to inject more entropy into the DTVV generation. The asynchronous aspects can be established by the browser extension being programmed to trigger state changes and requests early. These can be coupled with the generation of other user interface elements being rendered by the browser extension, such as buttons indicating different offers available based on parsed data on the browser rendering, etc.

In some embodiments, the browser extension can further include, based on extracted or parsed expected transaction costs, indications that the quick secure pay will increase the total amount of authorized expenditure for the particular card based on the specific security profile of the type of validation. For example, a purchase may be for a next generation video card or graphics card, which has a total price of $1,000 USD, but additional verifications would typically be needed if static information were provided using the card for any transactions over $250 USD. When the user is checking out, the browser extension may interrogate the DOM tree or other received HTML code sections to identify that the price is likely to be $1,000, and render graphical user interface elements such as notification banners or interactive elements noting that the quick secure pay is likely required for a purchase of this price.

Concurrent to the identification of the increased price, the browser extension can immediately begin the DTVV generation process with the payment processor backend server. Accordingly, a variation on the process can include approaches to improve the user experience through additional computational steps that are configured to operate temporally earlier in a checkout process to give time for encryption or other randomization activities. These can avoid impacts on the user experience, for example, where the user must wait several seconds or several minutes (e.g., if the backend is busy) for the improved security approach, etc. This is particularly useful for situations where there is going to be a major backlog in terms of timing of purchasing, such as the purchasing of concert tickets (where they go on sale altogether in waves), and a bottleneck could be otherwise be caused in the DTVV generation process, which could cause delayed purchases for users (e.g., missed the concert ticket purchase window because the DTVV took too long to generate).

Figure 12C:
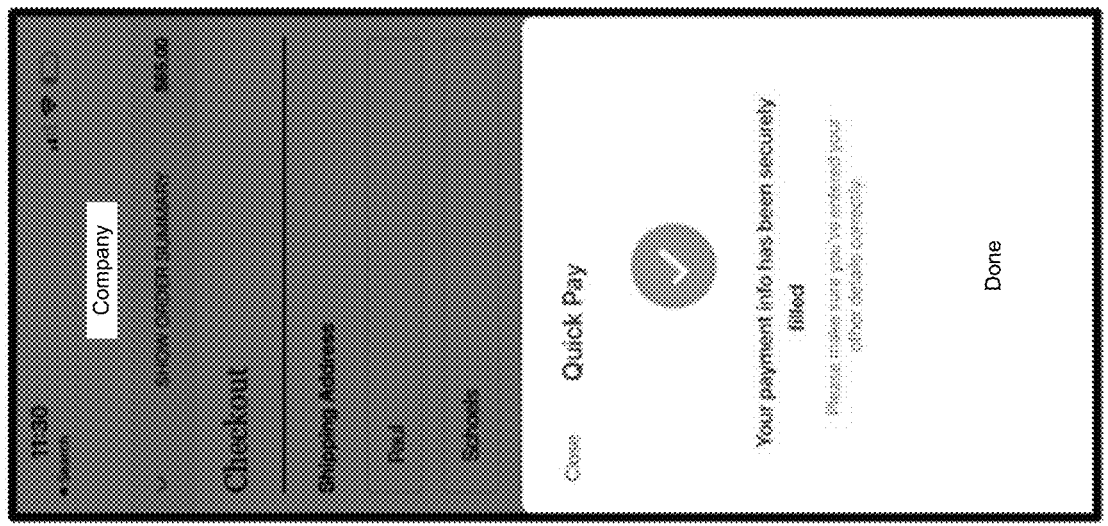
FIG. 12A, FIG. 12B, and FIG. 12C are example merchant webpage renderings showing the overlay being rendered by the extension module, according to some embodiments.
Figure 12B:
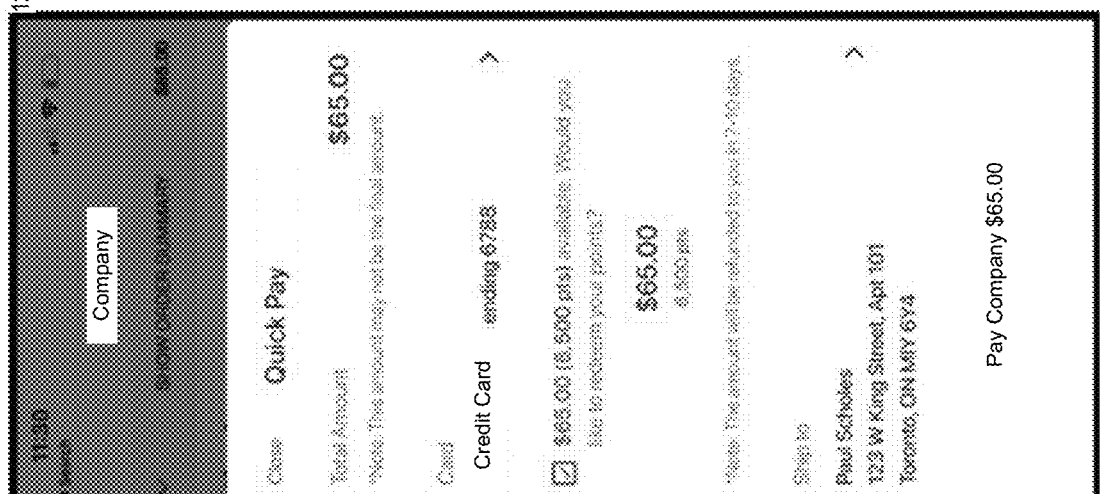
Figure 12A:
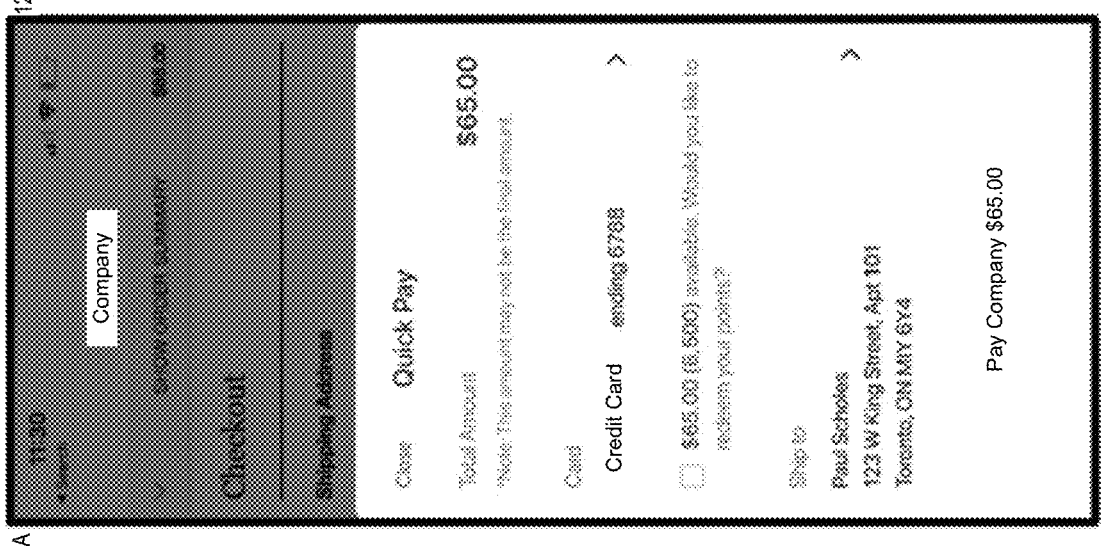

FIG. 12A, FIG. 12B, and FIG. 12C are example merchant webpage renderings showing the overlay being rendered by the extension module, according to some embodiments.

In FIG. 12A, at rendering 1202A. The module allows for the selection of a particular payment method, in this case, a credit card ending in 6788.

In FIG. 12B, at rendering 1202B, an optional flow injection is included where points can be redeemed as part of the purchase. When the user selects the pay Company $65 button on the bottom of the hybrid overlay, the extension is triggered to dynamically obtain credential values prior to progressing to the rendering 1202C of FIG. 12C, where the payment information was securely filled in.

Additional security elements, in some cases without additional input from the user, have been incorporated into the extension module and communicated with the backend server. Accordingly, a time-based element of approval and credentials are possible automatically without active intervention by the user.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for generating a graphical user interface overlay to render a hybrid web page in concert with a browser rendering engine, the system comprising:
    a computer processor operating in conjunction with one or more non-transitory computer readable memories;
    the computer processor configured to:
    receive, from a backend server during a pre-registration process, a data set representative of a tokenized version of payment credential information for a user, the data set stored on a secure key storage memory region operating as a secure hardware enclave, the data set including at least a private key;
    intercept, from the browser rendering engine, one or more webpage rendering inputs or one or more webpage rendering outputs;
    process the one or more webpage rendering inputs or the one or more webpage rendering outputs to determine that a checkout state is being entered in the browser rendering engine;
    render the graphical user interface overlay in line with or over top a merchant webpage to establish the hybrid webpage, the graphical user interface overlay enabling a selection of the tokenized version of the payment credential information for payment by the user;
    transmit a payment request message to the backend server requesting encrypted dynamic payment credentials corresponding to the tokenized version of the payment credential information, the encrypted dynamic payment credentials encrypted using a public key stored by the backend server corresponding to the private key;
    decrypt the encrypted dynamic payment credentials to retrieve decrypted dynamic payment credentials;and
    insert, in payment information fields of the hybrid webpage, payment fields based at least on a combination of the tokenized version of the payment credential information and the decrypted dynamic payment credentials.

2. The system of claim 1, wherein the computer processor is configured to:
    generate an instance or session key pair having a public key and a corresponding private key, the public key shared with the backend server before receiving the data set representative of the tokenized version of the payment credential information; and
    wherein the private key is utilized to digitally sign the payment request message, the back end server configured only to respond with the dynamic payment credentials if a payment request message signature corresponds to the public key.

3. The system of claim 1, wherein the tokenized version of the payment credential information is spawned by the backend server specifically for usage with the graphical user interface overlay, binding the payment credential information to the graphical user interface overlay.

4. The system of claim 3, wherein the tokenized version of the payment credential information spawned by the backend server is automatically associated with one or more payment restrictions enforced for payments conducted through the graphical user interface overlay.

5. The system of claim 1, wherein the checkout state is determined through an automatic parsing of a URL corresponding to the one or more webpage rendering inputs or the one or more webpage rendering outputs.

6. The system of claim 1, wherein the checkout state is determined through an automatic comparison of a URL corresponding to the one or more webpage rendering inputs or the one or more webpage rendering outputs against a blacklist or whitelist data structure of the backend server.

7. The system of claim 5, wherein the payment request message is transformed or incorporates a field corresponding to the URL, and the dynamic payment credentials generated in response are valid only for a transaction at a merchant or at a website corresponding to the URL.

8. The system of claim 7, wherein the field corresponding to the URL is used to generate a URL keypair having a URL public key sent as part of the payment request message, and the dynamic payment credentials are encrypted using the URL public key for decryption using a corresponding URL private key.

9. The system of claim 1, wherein the dynamic payment credentials include at least one of a dTVV or a dCVV value corresponding to the tokenized version of the payment credential information.

10. The system of claim 1, wherein the graphical user interface overlay is provided as a browser extension to the browser rendering engine.

11. A method for generating a graphical user interface overlay to render a hybrid web page in concert with a browser rendering engine, the method comprising:
   receiving, from a backend server during a pre-registration process, a data set representative of a tokenized version of payment credential information for a user, the data set stored on a secure key storage memory region operating as a secure hardware enclave, the data set including at least a private key;
   intercepting, from the browser rendering engine, one or more webpage rendering inputs or one or more webpage rendering outputs;
   processing the one or more webpage rendering inputs or the one or more webpage rendering outputs to determine that a checkout state is being entered in the browser rendering engine;
   rendering the graphical user interface overlay in line with or over top a merchant webpage to establishing the hybrid webpage, the graphical user interface overlay enabling a selection of the tokenized version of the payment credential information for payment by the user;
   transmitting a payment request message to the backend server requesting encrypted dynamic payment credentials corresponding to the tokenized version of the payment credential information, the encrypted dynamic payment credentials encrypted using a public key stored by the backend server corresponding to the private key;
   decrypting the encrypted dynamic payment credentials to retrieve decrypted dynamic payment credentials; and
   inserting, in payment information fields of the hybrid webpage, payment fields based at least on a combination of the tokenized version of the payment credential information and the decrypted dynamic payment credentials.

12. The method of claim 11, wherein the method comprises:
   generating an instance or session key pair having a public key and a corresponding private key, the public key shared with the backend server before receiving the data set representative of the tokenized version of the payment credential information; and
   wherein the private key is utilized to digitally sign the payment request message, the back end server configured only to respond with the dynamic payment credentials if a payment request message signature corresponds to the public key.

13. The method of claim 11, wherein the tokenized version of the payment credential information is spawned by the backend server specifically for usage with the graphical user interface overlay, binding the payment credential information to the graphical user interface overlay.

14. The method of claim 13, wherein the tokenized version of the payment credential information spawned by the backend server is automatically associated with one or more payment restrictions enforced for payments conducted through the graphical user interface overlay.

15. The method of claim 11, wherein the checkout state is determined through an automatic parsing of a URL corresponding to the one or more webpage rendering inputs or the one or more webpage rendering outputs.

16. The method of claim 11, wherein the checkout state is determined through an automatic comparison of a URL corresponding to the one or more webpage rendering inputs or the one or more webpage rendering outputs against a blacklist or whitelist data structure of the backend server.

17. The method of claim 15, wherein the payment request message is transformed or incorporates a field corresponding to the URL, and the dynamic payment credentials generated in response are valid only for a transaction at a merchant or at a website corresponding to the URL.

18. The method of claim 17, wherein the field corresponding to the URL is used to generate a URL keypair having a URL public key sent as part of the payment request message, and the dynamic payment credentials are encrypted using the URL public key for decryption using a corresponding URL private key.

19. The method of claim 11, wherein the dynamic payment credentials include at least one of a dTVV or a dCVV value corresponding to the tokenized version of the payment credential information.

20. A non-transitory computer readable medium, storing machine interpretable instructions, which when executed, perform a method for generating a graphical user interface overlay to render a hybrid web page in concert with a browser rendering engine, the method comprising:
   receiving, from a backend server during a pre-registration process, a data set representative of a tokenized version of payment credential information for a user, the data set stored on a secure key storage memory region operating as a secure hardware enclave, the data set including at least a private key;
   intercepting, from the browser rendering engine, one or more webpage rendering inputs or one or more webpage rendering outputs;
   processing the one or more webpage rendering inputs or the one or more webpage rendering outputs to determine that a checkout state is being entered in the browser rendering engine;
   rendering the graphical user interface overlay in line with or over top a merchant webpage to establishing the hybrid webpage, the graphical user interface overlay enabling a selection of the tokenized version of the payment credential information for payment by the user;
   transmitting a payment request message to the backend server requesting encrypted dynamic payment credentials corresponding to the tokenized version of the payment credential information, the encrypted dynamic payment credentials encrypted using a public key stored by the backend server corresponding to the private key;
   decrypting the encrypted dynamic payment credentials to retrieve decrypted dynamic payment credentials; and
   inserting, in payment information fields of the hybrid webpage, payment fields based at least on a combination of the tokenized version of the payment credential information and the decrypted dynamic payment credentials.

* * * * *